US012001718B2

(12) United States Patent
    Wang

(10) Patent No.: US 12,001,718 B2
(45) Date of Patent: Jun. 4, 2024

(54) BURST READ DATA STORAGE

(71) Applicant: Micron Technology, Inc., Boise, ID (US)

(72) Inventor: Hui Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/845,485

(22) Filed: Jun. 21, 2022

(65) Prior Publication Data

US 2023/0367514 A1    Nov. 16, 2023

(30) Foreign Application Priority Data

May 13, 2022 (CN) .......................... 202210522845.1

(51) Int. Cl.
    *G06F 3/06* (2006.01)
(52) U.S. Cl.
    CPC .......... *G06F 3/0659* (2013.01); *G06F 3/0604* (2013.01); *G06F 3/064* (2013.01); *G06F 3/0673* (2013.01)
(58) Field of Classification Search
    None
    See application file for complete search history.

(56) References Cited

U.S. PATENT DOCUMENTS

| 7,689,781 | B2 * | 3/2010 | De Perthuis | ............ G06F 13/18 |
| | | | | 711/151 |
| 10,120,792 | B1 * | 11/2018 | Segal | ...................... G06F 3/061 |
| 2010/0174847 | A1 * | 7/2010 | Paley | .................. G06F 12/0246 |
| | | | | 711/E12.008 |
| 2014/0071753 | A1 * | 3/2014 | Shin | ..................... G06F 12/0246 |
| | | | | 365/185.01 |
| 2015/0301763 | A1 * | 10/2015 | Shaharabany | ...... G06F 12/0246 |
| | | | | 711/147 |
| 2017/0371588 | A1 * | 12/2017 | Shaharabany | .......... G06F 3/061 |
| 2018/0121128 | A1 * | 5/2018 | Doyle | .................... G11C 16/10 |
| 2019/0265888 | A1 * | 8/2019 | Yang | ................... G11C 11/5671 |
| 2021/0117106 | A1 * | 4/2021 | Yang | ..................... G06F 3/0679 |

* cited by examiner

*Primary Examiner* — Charles J Choi
(74) *Attorney, Agent, or Firm* — Harrity & Harrity, LLP

(57) ABSTRACT

Implementations described herein relate to burst data read storage. In some implementations, a controller may receive a write command. The controller may determine whether a burst read flag, included in the write command, is set. The controller may write host data, associated with the write command, to a first type of storage block of the memory device or to a second type of storage block of the memory device based on whether the burst read flag is set.

25 Claims, 18 Drawing Sheets

| Byte \ Bit | 7 | 6 | 5 | 4 | 3 | 2 | 1 | 0 |
|---|---|---|---|---|---|---|---|---|
| 0 | Operation Code Field 502 ||||||||
| 1 | colspan=3 Write Protect Field 504 ||| colspan=2 Priority Field 506 || FUA Field 508 | Burst Read Indicator Field 510 |
| 2 | Logical Block Address Field(s) 512 ||||||||
| 3 | colspan=8 ||||||||
| 4 | colspan=8 ||||||||
| 5 | colspan=8 ||||||||
| 6 | Reserved Field(s) 514 ||| Group Number Field 516 |||||
| 7 | Transfer Length Field(s) 518 ||||||||
| 8 | colspan=8 ||||||||
| 9 | Control Field(s) 520 ||||||||

BURST READ DATA STORAGE

CROSS-REFERENCE TO RELATED APPLICATION

This Patent Application claims priority to Chinese Patent Application No. 202210522845.1, filed on May 13, 2022, and entitled "BURST READ DATA STORAGE." The disclosure of the prior Application is considered part of and is incorporated by reference into this Patent Application.

TECHNICAL FIELD

The present disclosure generally relates to memory devices, methods performed by memory devices, and to burst read data storage.

BACKGROUND

NAND flash memory, which may also be referred to as a "NAND" or a "NAND memory device," is a non-volatile type of memory device that uses circuitry similar to or resembling NAND logic gates to enable electrically programming, erasing, and storing of data even when a power source is not supplied. NANDs may be used in various types of electronic devices, such as computers, mobile phones, or automobile computing systems, among other examples.

A NAND memory device may include an array of flash memory cells, a page buffer, and a column decoder. In addition, the NAND memory device may include a control logic unit (e.g., a controller), a row decoder, or an address buffer, among other examples. The memory cell array may include memory cell strings connected to bit lines, which are extended in a column direction.

A flash memory cell, which may be referred to as a "cell" or a "data cell," of a NAND memory device may include a current path formed between a source and a drain on a semiconductor substrate. The flash memory cell may further include a floating gate and a control gate formed between insulating layers on the semiconductor substrate. A programming operation (sometimes called a write operation) of the flash memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the flash memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the flash memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A memory device may include a plurality of page buffers connected between the bit lines and the column decoder. The column decoder is connected between the page buffer and data lines.

BRIEF DESCRIPTION OF THE DRAWINGS

FIG. 5 is a diagram illustrating an example of a write command.

DETAILED DESCRIPTION

A vehicle may include various electronic devices such as sensors, controllers, and memory devices that support various functional features of the vehicle. The sensors may generate sensor data, which may be used by the controllers to support the functional features of the vehicle. The memory devices may store the sensor data, which may be accessed by and/or provided to the controllers on an in-vehicle communication network (e.g., a controller area network (CAN) bus, among other examples).

The functional features of the vehicle may include time-sensitive and/or real-time functional features that rely on low latency communication and operation of the electronic devices of the vehicle. These functional features may include safety features and autonomous driving features such as automatic braking, blind spot monitoring, autonomous steering, cruise control, and/or collision detection, among other examples. Latency in the operation of the electronic devices may result in degraded performance for these functional features. Latency in the operation of the electronic devices can occur, for example, due to prolonged system boot times, system resume time (e.g., from hibernation), and/or increased read times, among other examples.

In some implementations described herein, a memory controller (e.g., a managed NAND controller or another type of memory controller) may be perform burst read data storage techniques described herein to reduce latency for the operation of one or more electronic components included in a vehicle. The memory controller and the memory device may be associated with a sensor or another type of host device included in the vehicle.

When the host device has data to store in the memory device (e.g., system image files or file system data), the host device may set a flag in a write command associated with the host data. The memory controller may determine that the flag has been set for the host data, and may optimize data storage for the host data to achieve increased read performance for the host data (e.g., for the memory controller, for the host device, or for another electronic device included in the vehicle). The burst read data storage techniques described herein may provide reduced read times for the host data (e.g., as compared to standard read techniques), which may reduce latency in the operation of one or more electronic components included in the vehicle. The reduced latency may be achieved through reduced system boot times and/or reduced system resume times, among other examples, due to the reduced read times provided by the burst read data storage techniques described herein. The reduced latency may improve the performance of one or more functional features of the vehicle, such as reduced blind spot detection times, more responsive automatic breaking and autonomous steering, and enhanced collision detection, among other examples.

Figure 1:
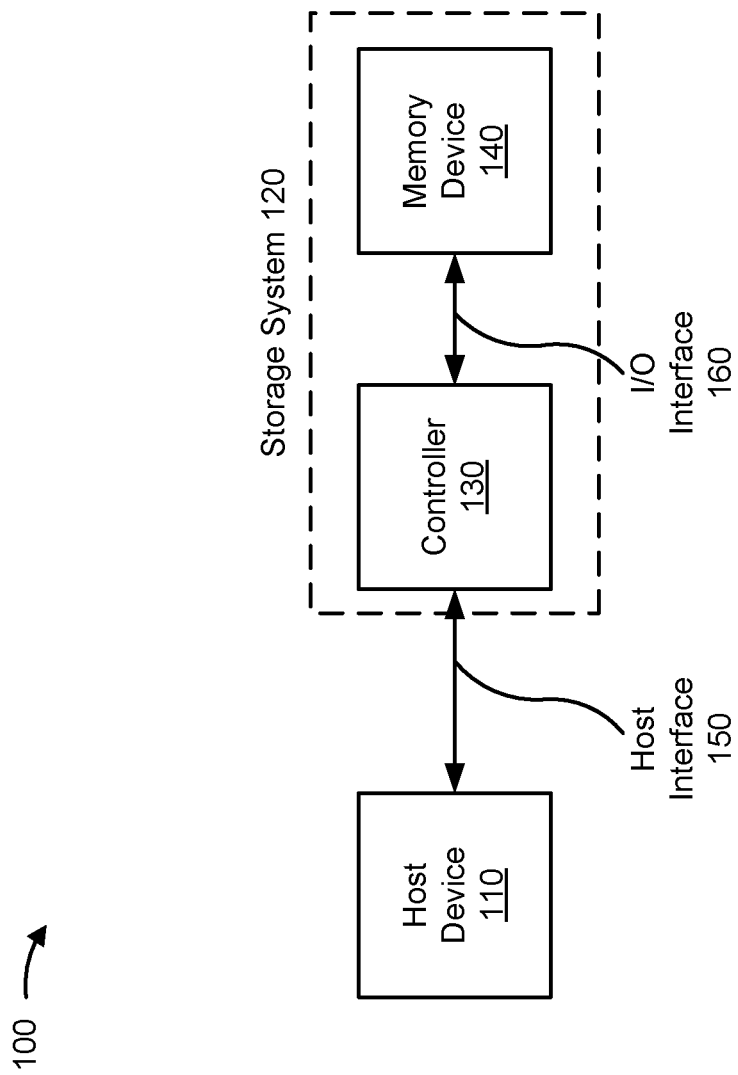
FIG. 1 is a diagram illustrating an example of a host device in communication with a storage system.

FIG. 1 is a diagram illustrating an example 100 of a host device 110 in communication with a storage system 120. The storage system 120 may include a controller 130 and a memory device 140. The host device 110 may communicate with the storage system 120 (e.g., the controller 130 of the storage system 120) via a host interface 150. The controller 130 and the memory device 140 may communicate via an input/output (I/O) interface 160.

The host device 110 may include or may be included in a computer, a mobile phone, a wired or wireless communication device, a network device, a server, an Internet of Things (IoT) device, and/or a sensor, among other examples. The storage system 120 may be included in the host device 110, or may be a device that is separate from the host device 110.

In some implementations, the host device 110 and the storage system 120 are included in a vehicle. The host device 110 may be configured to perform one or more operations associated with the vehicle. For example, the host device 110 may include a vehicle sensor that is configured to generate sensor data, which may be used by other controllers of the vehicle to support the functional features of the vehicle. The sensor data may include, for example, proximity data, camera images, recorded video, RADAR data, LiDAR data, humidity data, temperature data, oxygen concentration data, vibration data, and/or another type of sensor data. The functional features of the vehicle may include time-sensitive and/or real-time functional features that rely on low latency communication and operation of the electronic devices of the vehicle. These functional features may include safety features and autonomous driving features such as automatic braking, blind spot monitoring, autonomous steering, cruise control, and/or collision detection, among other examples.

The storage system 120 may be configured to store the sensor data and/or may be configured to store system data associated with the host device. The system data may include, for example, system image files (e.g., a bootloader image, a kernel image) and/or system metadata, among other examples.

The host device 110 may include one or more processors configured to execute instructions and store data in the memory device 140. For example, the host device 110 may include a central processing unit (CPU), a graphics processing unit (GPU), a field-programmable gate array (FPGA), an application-specific integrated circuit (ASIC), and/or a controller.

The storage system 120 may be any electronic device configured to store data in memory. In some implementations, the storage system 120 may be an electronic device configured to store data persistently in non-volatile memory. For example, the storage system 120 may be a solid-state drive (SSD), a flash memory device (e.g., a NAND flash device), a universal flash storage (UFS), a universal serial bus (USB) thumb drive, a memory card (e.g., a secure digital (SD) card), a secondary storage device, and/or an embedded multimedia card (eMMC) device.

The controller 130 may include a system controller, a memory controller, and/or any device configured to communicate with the host device (e.g., via the host interface 150) and the memory device 140 (e.g., via the I/O interface 160) and/or configured to control operations of the storage system 120. For example, the controller 130 may include an ASIC, an FPGA, a processor, and/or a controller. In some implementations, the controller 130 includes one or more components described herein, such as a memory manager and/or an array controller, among other examples. Moreover, the controller 130 may include one or more memory devices, which may include a random access memory (RAM) device, a read-only memory (ROM) device, a flash memory device (e.g., a NAND memory device), and/or another type of memory device. The one or more memory devices may include a non-volatile memory, such as a flash memory device and/or a non-volatile RAM (NVRAM) device (e.g., a magnetic RAM (MRAM) device, a phase change RAM (PC-RAM) device, a spin transfer torque RAM (STT-RAM) device, a resistive RAM (RRAM) device). The one or more memory devices may include a volatile memory device, such as a static RAM (SRAM) device and/or a dynamic RAM (DRAM) device, among other examples.

The memory device 140 may be a non-volatile memory device configured to maintain data stored in memory after the memory device 140 is powered off (e.g., configured for persistent data storage). In some implementations, the memory device 140 is a NAND memory device. Although some techniques are described herein in connection with NAND memory devices, in some implementations, one or more of these techniques may be performed in connection with other types of non-volatile memory devices, such as NOR memory devices.

The controller 130 may transmit a command to the memory device 140 based on an instruction received from the host device 110. The command may be, for example, a read command, a write command (sometimes called a program command), or an erase command. Additionally, or alternatively, the command may indicate the data to be read, written, or erased, and/or may indicate a location (e.g., in memory) for the data to be read, written, or erased. In some implementations, the controller 130 may transmit, to the memory device 140, a cryptographic signature associated with the command. The controller 130 may generate the cryptographic signature based on, for example, the command (e.g., generated based on the instruction received from the host device 110), a cryptographic key (e.g., a private key or a secret key stored by the controller 130), and/or a nonce value. The cryptographic key may be stored by the controller 130 and by the memory device 140 and may not be shared with other devices (e.g., other than the controller 130 and the memory device 140). The nonce value may be based on, for example, a monotonic counter value stored by the controller 130 and by the memory device 140. In some implementations, the cryptographic signature may be generated (e.g., by the controller 130) by applying a hash-based message authentication code (HMAC) function or algorithm to the command, the cryptographic key, and the nonce value.

The controller 130 may also receive read commands and write commands from the host device 110 via the host interface 150. The host device 110 may provide a write command to the controller 130 to cause the controller 130 to write host data to the memory device 140. The host device 110 may provide a read command to the controller 130 to cause the controller 130 to read host data from the memory device 140 and provide the host data to the host device 110.

For a write command, the controller 130 may allocate a location for the host data (e.g., the host data to be stored in the memory device 140) based on an indication in the write command. The location may be indicated as a physical location and/or a logical/virtual location. The controller 130 store host data into the location and may retrieve the host data from the location in a subsequent read operation. The write command may include a small computer system interface (SCSI) write command or another type of write command.

For a read command, the controller 130 may determine or identify a location of the host data (e.g., the host data stored in the memory device 140)based on a location indication in the read command. The controller 130 may retrieve the host data from the physical location and provide the host data to the host device 110. The read command may included a query-get command or another type of read command, a logical block address (LBA) read command, or another type of read command.

The location may be indicated in the read command as a logical location or a logical address. The controller 130 may determine the physical location of the host data from the logical location using a mapping table. The mapping table may be stored in a memory device of the controller 130 (e.g., a RAM device, a flash memory device) or in a dedicated location in the memory device 140 for mapping tables. A mapping table may include a logical to physical (L2P) table or another type of electronic data structure that identifies an association between a logical (or virtual) location and a physical location in the memory device 140. A logical location may refer to a location in a logical structure or a virtual structure, whereas a physical location may refer to a physical address of a memory cell on the memory device 140. The physical memory cells of the memory device 140 may be grouped into various logical structure configurations to virtualize the memory cells of the memory device 140. As an example, a plurality of memory cells may be grouped into a "page" of memory. A plurality of pages of memory may be grouped into a "block" of memory. Blocks and/or pages of memory may be grouped into a logical unit such as a partition, which may be assigned a logical unit number (LUN) or another type of logical identifier.

As indicated above, FIG. 1 is provided as an example. Other examples may differ from what is described with regard to FIG. 1.

Figure 2:
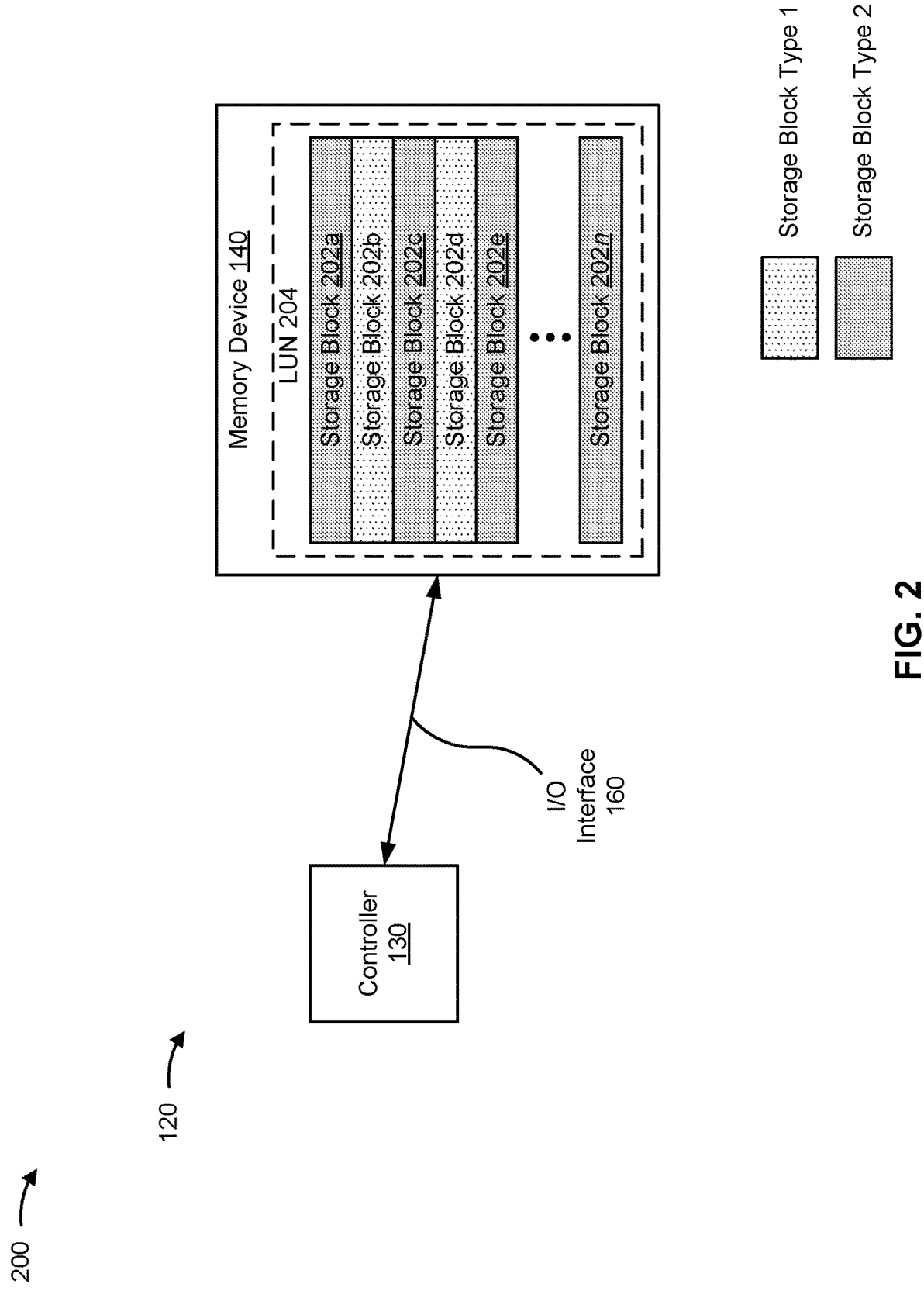
FIG. 2 is a diagram illustrating an example of a storage system configured for burst read data storage.

FIG. 2 is a diagram illustrating an example 200 of the storage system 120 configured for burst read data storage. As shown in FIG. 2, the storage system 120 includes the controller 130 and the memory device 140, which communicate via the I/O interface 160. The controller 130 is configured to write host data (e.g., associated with the host device 110) to the memory device 140 in a manner that optimizes or improves reads of the host data from the memory device 140 for increased read speed and reduced read times.

As shown in FIG. 2, the memory device 140 includes a plurality of storage blocks 202a-202n, where n is a configurable quantity of storage blocks. The storage blocks 202a-202n may each include one or more pages of memory cells of the memory device 140. The storage blocks 202a-202n may be associated with a logical or virtual unit of the memory device 140, such as a partition. The logical or virtual unit may be associated with an identifier, such as a LUN 204. In some implementations, the memory device 140 includes a plurality of logical or virtual units, where each logical or virtual unit is associated with a respective LUN.

The LUN 204 may be configurable to include multiple types of storage blocks. Moreover, the controller 130 may flexibly configure the storage blocks 202a-202n to operate as one or more storage block types. For example, the controller 130 may configure one or more storage blocks (e.g., storage block 202b, storage block 202d) as a first storage block type (Storage Block Type 1). As another example, the controller 130 may configure one or more storage blocks (e.g., storage block 202a, storage block 202c, storage block 202e, and storage block 202n) as a second storage block type (Storage Block Type 2). Additional storage block types are within the scope of the present disclosure. The controller 130 may flexibly configure the storage blocks 202a-202n to operate as one or more storage block types during production of the storage system 120, while the storage system 120 is deployed and in operation, during maintenance of the storage system 120, and/or in another type of implementation. In this way, the controller 130 may flexibly configure a single logical unit or partition of the memory device 140 (which is associated with a single LUN 204) to include multiple types of storage block types, where the respective quantities of each storage block type can be flexibly configured and modified (e.g., increased and/or decreased) by the controller 130.

The controller 130 may use the capability to configure the storage blocks 202a-202n of the LUN 204 as different storage block types to enable the controller 130 to configure a subset of the storage blocks 202a-202n for standard read data storage and another subset of the storage blocks 202a-202n for burst read data storage. Burst read data storage, as used herein, refers to the storage of data using parameters that are configured to optimize or improve read speeds (and to reduce read times) for reading the data relative to standard read data storage. Standard read data storage may refer to storage of data using parameters that are configured for balanced performance, such as a balance of read speed, write speed (or program time), and/or data endurance (e.g., the length of data retention in the memory device 140 before the data becomes unreadable), among other examples.

To provide improved read speeds (e.g., increased read speeds and reduced read times) for burst read data storage blocks (e.g., Storage Block Type 1), the controller 130 may configure one or more of the storage blocks 202a-202n as single level cell (SLC) storage block(s) that include SLC memory cells. An SLC memory cell refers to a memory cell that selectively stores data in one of two possible states, where each state is associated with a respective voltage level or another respective parameter (e.g., a respective resistance, a respective magnetism). Accordingly, an SLC memory cell is configured to store one bit of data. Burst read data storage blocks may be configured as SLC storage blocks to provide improved read performance in that SLC memory cells may have faster read speeds and reduced read times relative to multiple level cell (MLC) storage blocks for standard read data storage blocks. The standard read data storage blocks may be configured as MLC storage blocks to provide greater storage density relative to the burst read data storage blocks.

As used herein, "MLC" refers to the storage of greater than one bit per memory cell. MLC encompasses and/or includes double level cell (DLC) memory cells (e.g., cells that are configured to store two bits of data per memory cell), triple level cell (TLC) memory cells (e.g., cells that are configured to store three bits of data per memory cell), quadruple level cell (QLC) memory cells (e.g., cells that are configured to store four bits of data per memory cell), pentad level cell (PLC) memory cells (e.g., cells that are configured to store five bits of data per memory cell), and memory cells that are configured to store a greater quantity of bits of data per memory cell.

The controller 130 may configure the storage blocks 202a-202n when the host device 110 provides data to be written by the controller 130. For example, the controller 130 may configure a first subset of the storage blocks 202a-202n as SLC storage blocks to store data during host write burst data and a second subset of the storage blocks 202a-202n as MLC storage blocks to store data during host write normal data. As described above, the controller 130 may flexibly increase and/or decrease the quantity of storage blocks of each storage block type in the LUN 204. The controller 130 may flexibly increase and/or decrease the quantity of storage blocks of each storage block type in the LUN 204 while the storage system 120 is in operation (e.g., at runtime), while the storage system 120 is idle or in hibernation mode, and/or at another time. In this way, the quantity of burst read data storage blocks can be scaled up or down to accommodate different burst read data storage needs and/or to accommodate dynamic changes in burst read data storage needs for the host device 110.

As indicated above, FIG. 2 is provided as an example. Other examples may differ from what is described with regard to FIG. 2.

Figure 3:
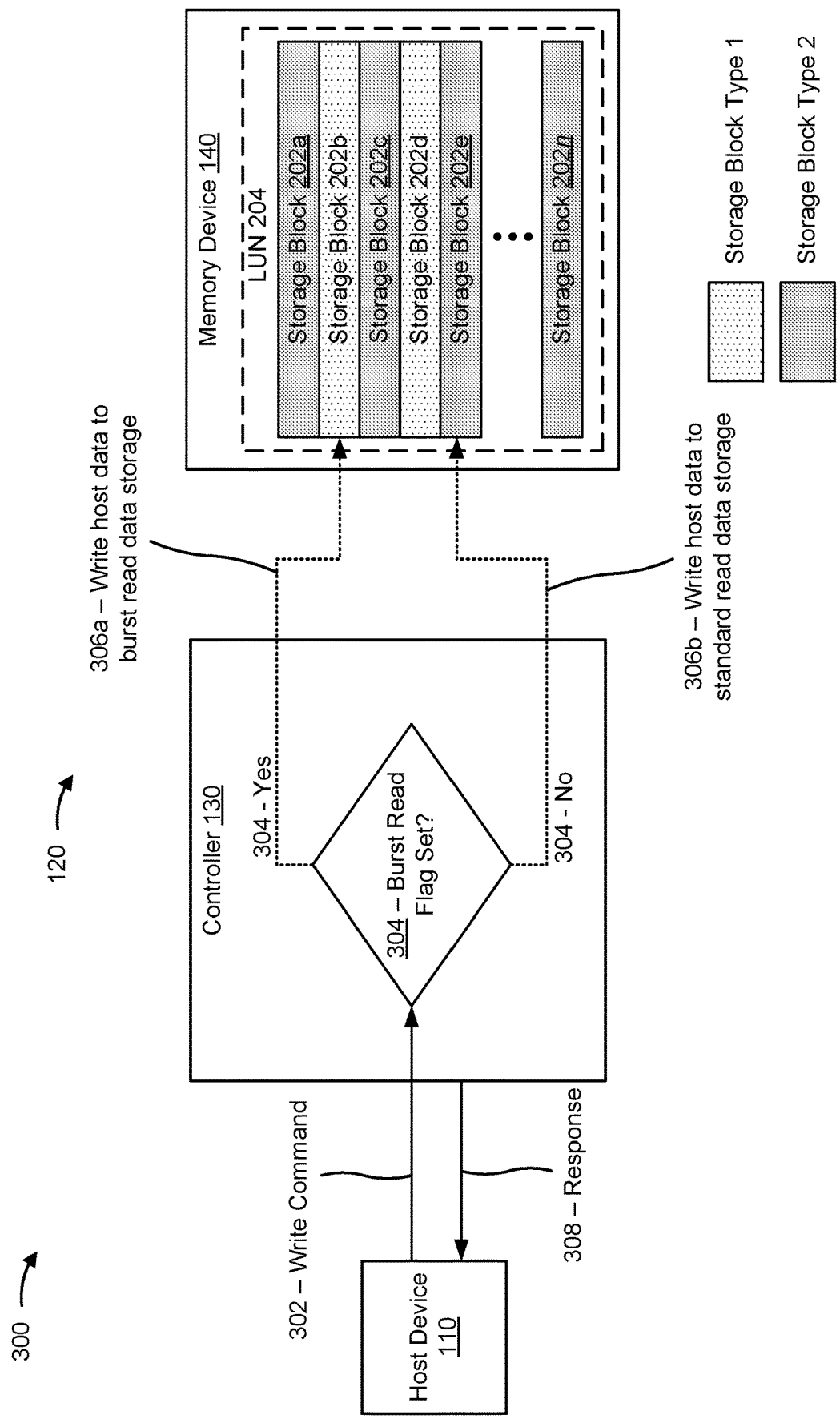
FIGS. 3 and 4 are diagrams illustrating examples of burst read data storage.

FIG. 3 is a diagram illustrating an example 300 of burst read data storage. In particular, the example 300 includes an example of storing or writing host data to one or more burst read data storage blocks (e.g., one or more of the storage blocks 202a-202n configured as burst read data storage blocks). As shown in FIG. 3, one or more operations described in connection with the example 300 may be performed by one or more devices, such as the host device 110, the storage system 120, the controller 130, and/or the memory device 140, among other examples.

At 302, the host device 110 may provide a write command to the storage system 120. The host device 110 may provide the write command to cause the storage system 120 to store host data associated with the host device 110. The host data may include a plurality of data packets that are associated with a single write command. Alternatively, a plurality of subsets of the data packets of the host data may be associated with respective write commands. The host device 110 may provide the write command to the controller 130 via the host interface 150. The controller 130 may receive the write command from the host device 110.

The write command may include a burst read indicator field that is configured for a burst read flag. The burst read flag may be selectively set to indicate whether host data associated with the write command is to be stored in one or more burst read data storage blocks or one or more standard read data storage blocks in the memory device 140. The write command may include additional fields, which are described in connection with FIG. 5.

At 304, the controller 130 determines whether a burst read flag is set in the write command. For example, the controller 130 may identify the burst read indicator field in the write command, and may determine whether the burst read indicator field includes a burst read flag.

At 306a, if the controller 130 determines that the burst read flag is set in the write command (304—Yes), the controller 130 may write the host data to burst read data storage blocks (e.g., the storage blocks configured as Storage Block Type 1) of the logical unit or partition associated with the LUN 204. Alternatively, at 306b, the controller 130 may write the host data to standard read data storage blocks (e.g., the storage blocks configured as Storage Block Type 2) of the logical unit or partition associated with the LUN 204 based on determining that the burst read flag is not set.

Additionally, the controller 130 may determine whether sufficient resources are available in the memory device 140 for the write command. For example, if the controller 130 is to write the host data to the burst read data storage blocks, the controller 130 may determine whether a sufficient quantity of burst read data storage blocks is available to write the host data to the burst read data storage blocks. The controller 130 may write the host data to the burst read data storage blocks based on determining that a sufficient quantity of burst read data storage blocks are available to write the host data to the burst read data storage blocks. Alternatively, the controller 130 may report a write error to the host device 110 based on determining that a sufficient quantity of burst read data storage blocks is not available to write the host data to the burst read data storage blocks.

Similarly, if the controller 130 is to write the host data to the standard read data storage blocks, the controller 130 may determine whether a sufficient quantity of standard read data storage blocks is available to write the host data to the standard read data storage blocks. The controller 130 may write the host data to the standard read data storage blocks based on determining that a sufficient quantity of standard read data storage blocks are available to write the host data to the standard read data storage blocks. Alternatively, the controller 130 may report a write error to the host device 110 based on determining that a sufficient quantity of standard read data storage blocks is not available to write the host data to the standard read data storage blocks.

The controller 130 may write the host data to the burst read data storage blocks to store the host data in SLC storage blocks for increased read speeds and reduced read times relative to storing the host data in MLC storage blocks of the standard read data storage blocks. Moreover, the controller 130 may write the host data to the burst read data storage blocks using a different set of trim parameters or trim settings than if the controller 130 were to write the host data to the standard read data storage blocks. For example, the controller 130 may store the host data in the burst read data storage blocks using read-enhanced trim parameters. The read-enhanced trim parameters may include a lesser data endurance parameter and/or an increased write time parameter to enable a reduced read time parameter to be used for reading the host data from the burst read data storage blocks. This provides increased read speeds for the burst read data storage blocks relative to the read speeds for the standard read data storage blocks. As another example, the controller 130 may store the host data in the standard read data storage blocks using a greater data endurance setting and/or an increased read time setting to enable increased write speed and increased data retention for the host data.

As another example, the controller 130 may store the host data in the burst read data storage blocks as page aligned (e.g., where the host data is written to a set of NAND pages that are configured to only store the host data) and/or block aligned (e.g., where the host data is written to a contiguous set of NAND pages in the same NAND block). Storing the host data as paged aligned and/or block aligned increases the sequential read speed for reading the host data from the memory device 140. If the controller 130 determines to store the host data in the standard read data storage blocks (e.g., based on determining that the burst read flag is not set in the write command), the controller 130 may store the host data opportunistically to the pages and/or blocks of the standard read data storage blocks (e.g., the host data does not have to be page aligned and/or block aligned)at the expense of increased read times.

As another example, the controller 130 may maintain separate mapping tables (e.g., separate L2P tables) for the burst read data storage blocks and the standard read data storage blocks. For example, the controller 130 may maintain and store a burst read data mapping table for the burst read data storage blocks associated with the LUN 204, and may maintain and store a standard read data mapping table for the standard read data storage blocks associated with the LUN 204. This enables the controller 130 to optimize the burst read data mapping table for the burst read data storage blocks and the storage of the burst read data mapping table.

In some implementations, the controller 130 configures the mapping entry size of the table entries in the burst read data mapping table to enable increased read speeds and reduced read times for the burst read data storage blocks. The controller 130 retrieves table entries of the burst read data mapping table from storage in order to perform a mapping table lookup to perform a read from the burst read data storage blocks. Each table entry covers a specific area or portion of the memory cells of the memory device 140. The controller 130 may configure the mapping entry size of the table entries to cover 4 kilobytes of data (and the corresponding quantity of memory cells to store the 4 kilobytes), 1 megabyte of data (and the corresponding quantity of memory cells to store the 1 megabyte), or another size, among other examples.

The controller 130 may increase the mapping entry size for the burst read data mapping table so that the mapping entry size for the burst read data mapping table is greater relative to a mapping entry size for the standard read data mapping table. This increased mapping entry size may result in fewer table entry retrieval operations that are needed in order to satisfy a read command for reading from the burst read data storage blocks. This results in reduced table entry loading overhead, which may increase read speed and reduce read time for reading from the burst read data storage blocks.

In some implementations, the controller 130 may store and/or maintain the boot read data mapping table and the standard read data mapping table in separate and/or different types of memory devices. For example, the controller 130 may store and/or maintain the boot read data mapping table in a memory device that provides faster reads and/or access times relative to a memory device in which the standard read data mapping table is stored. In some implementations, the controller 130 stores and/or maintains the boot read data mapping table in a RAM device such as an SRAM, a DRAM, and/or an NVRAM, among other examples. In particular, the controller 130 may load the boot read data mapping table into the RAM device during initialization of the storage system 120, and may maintain the boot read data mapping table in the RAM device during operation of the storage system 120. In other words, the controller 130 does not load and drop the boot read data mapping table from the RAM device to conserve memory resources in the RAM device and instead always keeps the boot read data mapping table in the RAM device during operation of the storage system 120. The RAM device may be included as a part of the controller 130 or may be included in another device. In some implementations, the controller 130 stores the standard read data mapping table in a flash memory device such as a NAND memory device. The NAND memory device may be included as a part of the controller 130 or may be included in another device such as the memory device 140.

At 308, the controller 130 may provide a response to the write command to the host device 110. The controller 130 may provide a write success response to indicate that the host data has been successfully written to the memory device 140 and that the write command has been satisfied. Moreover, if the host data was written to the burst read data storage blocks, the response may indicate that a burst read data write flow was performed to write the host data to the burst read data storage blocks. Alternatively, if the host data was written to the standard read data storage blocks, the response may indicate that a standard read data write flow was performed to write the host data to the standard read data storage blocks.

As indicated above, FIG. 3 is provided as an example. Other examples may differ from what is described with regard to FIG. 3.

Figure 4:
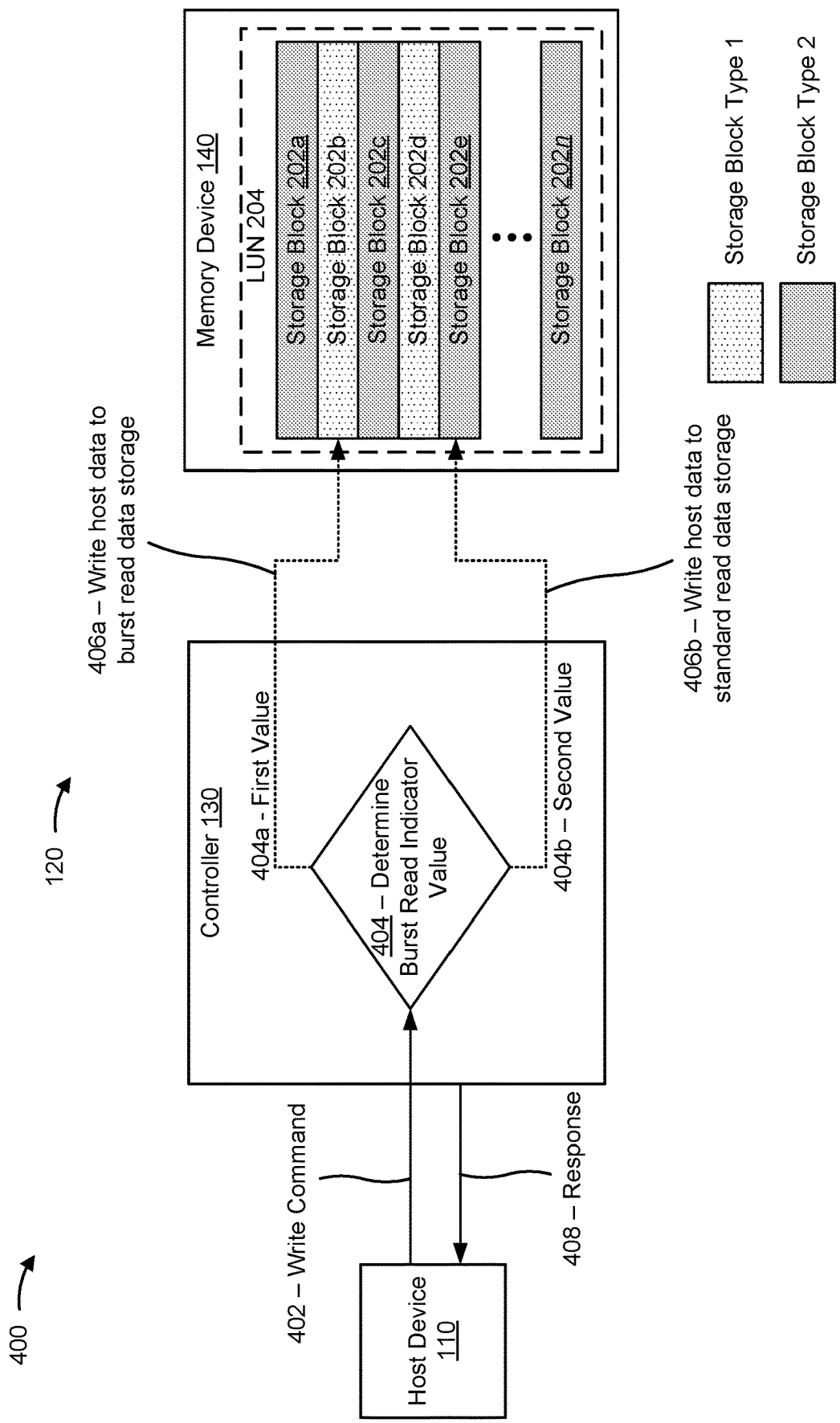

FIG. 4 is a diagram illustrating an example 400 of burst read data storage. In particular, the example 400 includes an example of storing or writing host data to one or more burst read data storage blocks (e.g., one or more of the storage blocks 202a-202n configured as burst read data storage blocks). As shown in FIG. 4, one or more operations described in connection with the example 400 may be performed by one or more devices, such as the host device 110, the storage system 120, the controller 130, and/or the memory device 140, among other examples.

At 402, the host device 110 may provide a write command to the storage system 120. The host device 110 may provide the write command to cause the storage system 120 to store host data associated with the host device 110. The host data may include a plurality of data packets that are associated with a single write command. Alternatively, a plurality of subsets of the data packets of the host data may be associated with respective write commands. The host device 110 may provide the write command to the controller 130 via the host interface 150. The controller 130 may receive the write command from the host device 110.

The write command may include a burst read indicator field that is configured for a burst read indicator value. The burst read indicator value may indicate whether host data associated with the write command is to be stored in one or more burst read data storage blocks or one or more standard read data storage blocks in the memory device 140. The burst read indicator value may include a bit string, a bit map, a hexadecimal value, and/or another type of indicator value. A first value 406a of the burst read indicator value may correspond to a burst read data storage write, and a second value 406b of the burst read indicator value may correspond to a standard read data storage write.

At 404, the controller 130 determines the burst read indicator value in the burst read indicator field of the write command. At 406a, if the controller 130 determines that the burst read indicator field includes the first value 406a of the burst read indicator value, the controller 130 may write the host data to burst read data storage blocks (e.g., the storage blocks configured as Storage Block Type 1) of the logical unit or partition associated with the LUN 204. Alternatively, at 406b, the controller 130 may write the host data to standard read data storage blocks (e.g., the storage blocks configured as Storage Block Type 2) of the logical unit or partition associated with the LUN 204 based on determining that the burst read indicator field includes the second value 406b of the burst read indicator value.

At 408, the controller 130 may provide a response to the write command to the host device 110. The controller 130 may provide the response to indicate that the host data has been written to the memory device 140 and that the write command has been satisfied. Moreover, if the host data was written to the burst read data storage blocks, the response may indicate that a burst read data write flow was performed to write the host data to the burst read data storage blocks. Alternatively, if the host data was written to the standard read data storage blocks, the response may indicate that a standard read data write flow was performed to write the host data to the standard read data storage blocks.

As indicated above, FIG. 4 is provided as an example. Other examples may differ from what is described with regard to FIG. 4.

FIG. 5 is a diagram illustrating an example 500 of an write command. In particular, the example 500 includes an example of a write command that is configured to include a burst read indicator field described herein. As described herein, the burst read indicator field in the write command may be used to selectively indicate whether a burst read data write flow is to be performed to write data to a memory device.

As shown in FIG. 5, the write command may include a plurality of bytes (e.g., byte 0-9) that each include a plurality of bits (e.g., bit 0-7). The quantities of bytes and bits included in the write command are examples, and other quantities are within the scope of the present disclosure. The write command may also include a plurality of fields. A field may occupy one or more bits and/or one or more bytes.

An operation code field 502 may be used to indicate that a command is a write command. In other words, the operation code field 502 specifies that a write command is to be performed by the recipient such as the storage system 120. A write protect field 504 may be used to indicate whether data associated with the write command is to be written with write protection. A priority field 506 may be used to indicate a retention priority for the data associated with the write command. The priority field 506 may also be referred to as a disable page out (DPO) field.

A force unit access (FUA) field 508 may be used to indicate whether the data associated with the write command may write the logical blocks of the data to volatile cache. A burst read indicator field 510 may be used to set a burst read flag or set a burst read indicator value to selectively indicate whether a burst read data write flow is to be performed for the data associated with the write command, or whether a standard read data write flow is to be performed for the data.

The write command may include one or more logical block address fields 512 that may be configured to indicate the location (e.g., the logical address) of the data associated with the write command. The write command may include one or more reserved fields 514, which may be reserved for future use. The write command may include a group number field 516, which may be used to indicate the group into which attributes associated with the command should be collected. The write command may include one or more transfer length fields 518, which may be used to indicate a quantity of contiguous logical blocks of data that are to be written as part of the write command. One or more control fields 520 of the write command may be used to indicate control information associated with the write command.

As indicated above, FIG. 5 is provided as an example. Other examples may differ from what is described with regard to FIG. 5. In particular, the burst read indicator field 510 may be include in other write commands having different fields and/or a different configuration of fields from the example 500 illustrated in FIG. 5.

Figure 6:
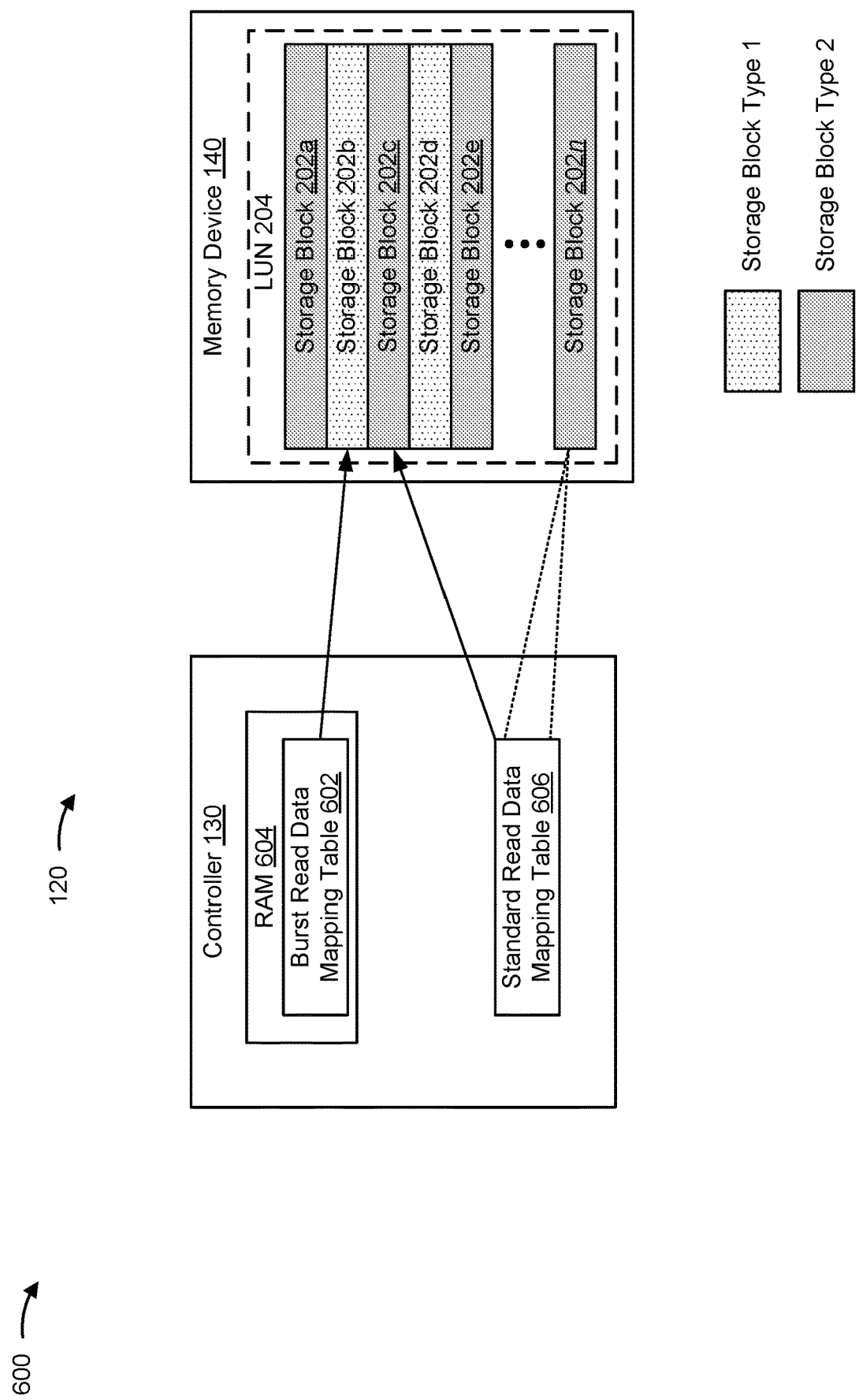
FIGS. 6-9 are diagrams illustrating examples of burst read data storage.

FIG. 6 is a diagram illustrating an example 600 of burst read data storage. In particular, the example 600 includes an example the controller 130 storing and/or maintaining a burst read data mapping table and a standard read mapping table in separate and/or different memory devices.

As shown in FIG. 6, a burst read data mapping table 602 may be stored and/or maintained in a RAM 604 (e.g., a RAM device). A standard read data mapping table 606 may be stored in the memory device 140, which may include a flash memory device such as a NAND memory device. As described above, storing the burst read data mapping table 602 in a RAM device may provide faster read times for the burst read data mapping table 602 relative to storing the burst read data mapping table 602 in a NAND memory device.

The burst read data mapping table 602 may indicate logical to physical mappings for the storage blocks of the memory device 140 that are configured as burst read data storage blocks (e.g., Storage Block Type 1). The standard read data mapping table 606 may indicate logical to physical mappings for the storage blocks of the memory device 140 that are configured as standard read data storage blocks (e.g., Storage Block Type 2).

As indicated above, FIG. 6 is provided as an example. Other examples may differ from what is described with regard to FIG. 6.

Figure 7:
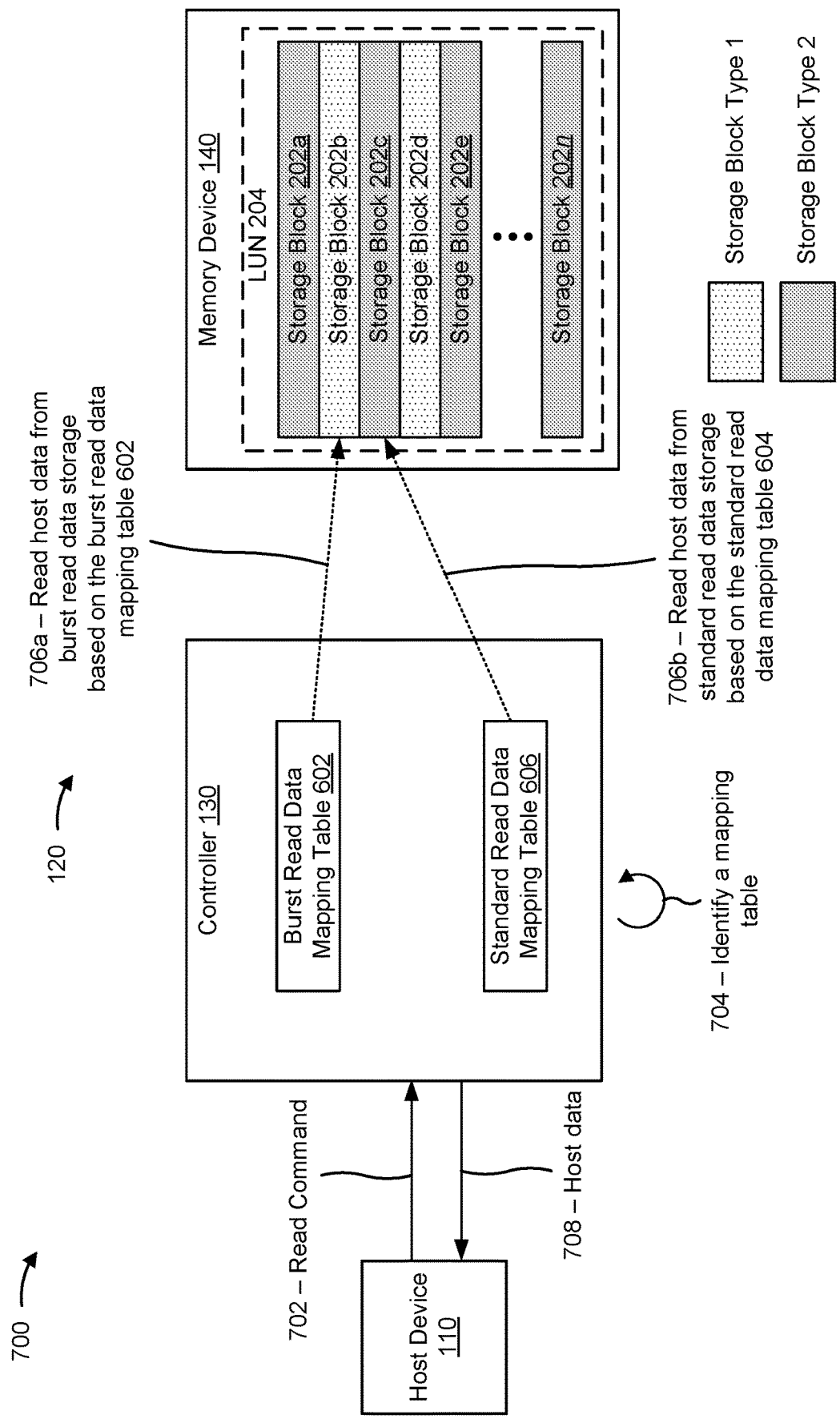

FIG. 7 is a diagram illustrating an example 700 of burst read data storage. In particular, the example 700 includes an example of reading host data from one or more burst read data storage blocks (e.g., one or more of the storage blocks 202a-202n configured as burst read data storage blocks). As shown in FIG. 7, one or more operations described in connection with the example 700 may be performed by one or more devices, such as the host device 110, the storage system 120, the controller 130, and/or the memory device 140, among other examples.

At 702, the host device 110 may provide a read command to the storage system 120. The host device 110 may provide the read command to cause the storage system 120 to read host data associated with the host device 110 and provide the host data to the host device 110. The host data may include a plurality of data packets that are associated with a single read command. Alternatively, a plurality of subsets of the data packets of the host data may be associated with respective read commands. The host device 110 may provide the read command to the controller 130 via the host interface 150. The controller 130 may receive read write command from the host device 110.

In some implementations, the host device 110 may provide the read command to the storage system 120 in connection with one or more events associated with the host device 110. As an example, the host device 110 may provide the read command to the storage system 120 in connection with a boot operation associated with the host device 110. In this way, the host device 110 may use the read command to obtain one or more electronic files from the memory device 140 to facilitate booting of the host device 110.

At 704, the controller 130 may identify a mapping table based on the read command. For example, the controller 130 may identify the burst read data mapping table 602 based on determining that the logical block address field(s) in the read command are associated with the burst read data mapping table 602. As another example, the controller 130 may identify the standard read data mapping table 606 based on determining that the logical block address field(s) in the read command are associated with the standard read data mapping table 606.

At 706a, if the controller 130 identifies the burst read data mapping table 602 based on the read command, the controller 130 may map the logical block addresses identified in the logical block address field(s) of the read command to physical addresses associated with one or more burst read data storage blocks (e.g., the storage blocks configured as Storage Block Type 1) of the memory device 140. The controller 130 may read the host data from the burst read data storage blocks. Alternatively, at 706*b*, if the controller 130 identifies the standard read data mapping table 606 based on the read command, the controller 130 may map the logical block addresses identified in the logical block address field(s) of the read command to physical addresses associated with one or more standard read data storage blocks (e.g., the storage blocks configured as Storage Block Type 2) of the memory device 140.

At 708, the controller 130 may provide the host data to the host device 110 to satisfy the read command. As described above in FIGS. 3 and 4, the controller 130 may write host data to the burst read data storage blocks using a burst read data write flow (e.g., as described in connection with 306*a* and 406*a*). The parameters used in the burst read data write flow, the configuration of the burst read data mapping table 602, the storage of the burst read data mapping table 602 in the RAM 604, and/or the configuration of the burst read data storage blocks as SLC storage blocks may increase the read speed (and reduce the read time or access time) for the controller 130 to read the host data from the burst read data storage blocks. The increased read speed and/or reduced read time reduces latency in the boot operation of the host device 110. This enables the host device 110 to boot and become operational more quickly, which increases the responsiveness and reduce operating latency of the host device 110. In the context of an automotive application, the ability of the host device 110 (e.g., which may include a vehicle sensor) to boot more quickly may enable reduced blind spot detection times, more responsive automatic breaking and autonomous steering, and enhanced collision detection, among other examples.

As indicated above, FIG. 7 is provided as an example. Other examples may differ from what is described with regard to FIG. 7.

Figure 8:
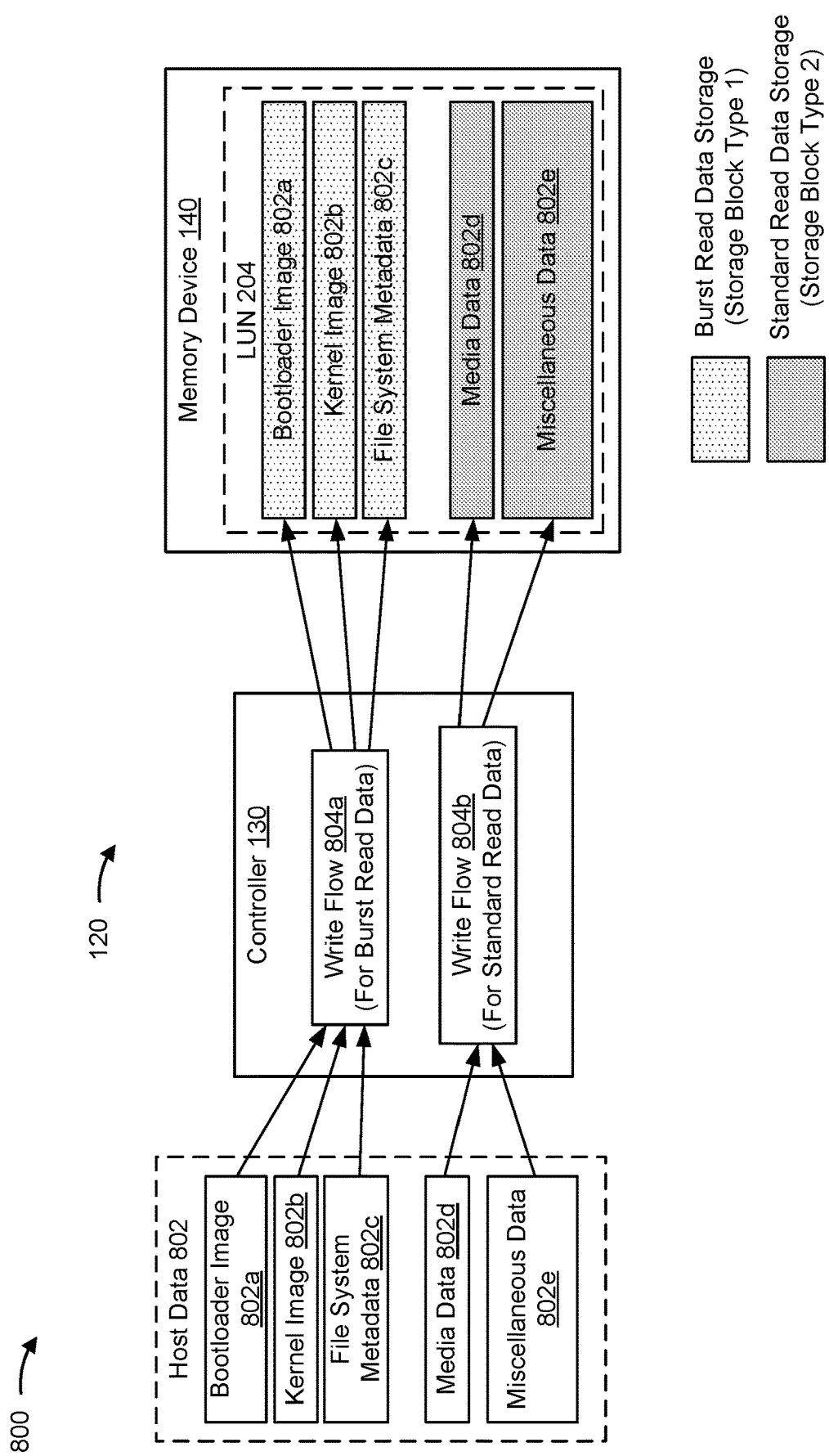

FIG. 8 is a diagram illustrating an example 800 of burst read data storage. In particular, the example 800 includes a plurality of example types of host data 802 that may be written to the memory device 140. Other types of host data are within the scope of the present disclosure.

As shown in FIG. 8, the host data 802 may include a bootloader image 802*a*, a kernel image 802*b*, file system metadata 802*c*, media data 802*d*, and/or miscellaneous data 802*e*, among other examples. The bootloader image 802*a* includes one or more electronic files that may be used by a basic input output system (BIOS) or user extensible firmware interface (UEFI) of the host device 110 to load the kernel of the operating system of the host device 110, to initialize main memory of the host device 110, and to perform other initial functions in a booting operation. The kernel image 802*b* includes one or more electronic files that include the kernel of the operating system of the host device 110. The file system metadata 802*c* includes one or more electronic files that include various types of information associated with a file system of the operating system of the host device 110. The media data 802*d* may include media associated with the operating system and/or one or more electronic applications of the host device 110. The miscellaneous data 802*e* may include one or more other types of electronic data, such as application data.

As further shown in FIG. 8, the controller 130 may write the host data 802 to the memory device 140. In some implementations, the controller 130 writes the bootloader image 802*a*, the kernel image 802*b*, the file system metadata 802*c*, the media data 802*d*, the miscellaneous data 802*e* to the same logical unit or partition of the memory device 140 (e.g., the same logical unit or partition associated with a single LUN 204). In some implementations, the controller 130 may write a subset of the host data 802 to the memory device 140. In some implementations, the controller 130 writes the bootloader image 802*a*, the kernel image 802*b*, the file system metadata 802*c*, the media data 802*d*, and/or the miscellaneous data 802*e* to the same logical unit or partition of the memory device 140.

As further shown in FIG. 8, the controller 130 may perform a write flow 804*a* for burst read data to write at least a subset of the host data 802 to one or more burst read data storage blocks (e.g., Storage Block Type 1) of the memory device 140. For example, controller 130 may perform a burst read data write flow (e.g., as described in connection with 306*a* and 406*a*) to optimize read speed and/or to reduce times for reading the bootloader image 802*a*, the kernel image 802*b*, and the file system metadata 802*c* from the memory device 140 to reduce boot latency of the host device 110.

As further shown in FIG. 8, the controller 130 may perform a write flow 804*b* for standard read data to write a subset of the host data 802 to one or more standard read data storage blocks (e.g., Storage Block Type 2) of the memory device 140. For example, controller 130 may perform a standard read data write flow (e.g., as described in connection with 306*b* and 406*b*) to enable increased storage density for the media data 802*d* and/or the miscellaneous data 802*e*.

As indicated above, FIG. 8 is provided as an example. Other examples may differ from what is described with regard to FIG. 8.

Figure 9:
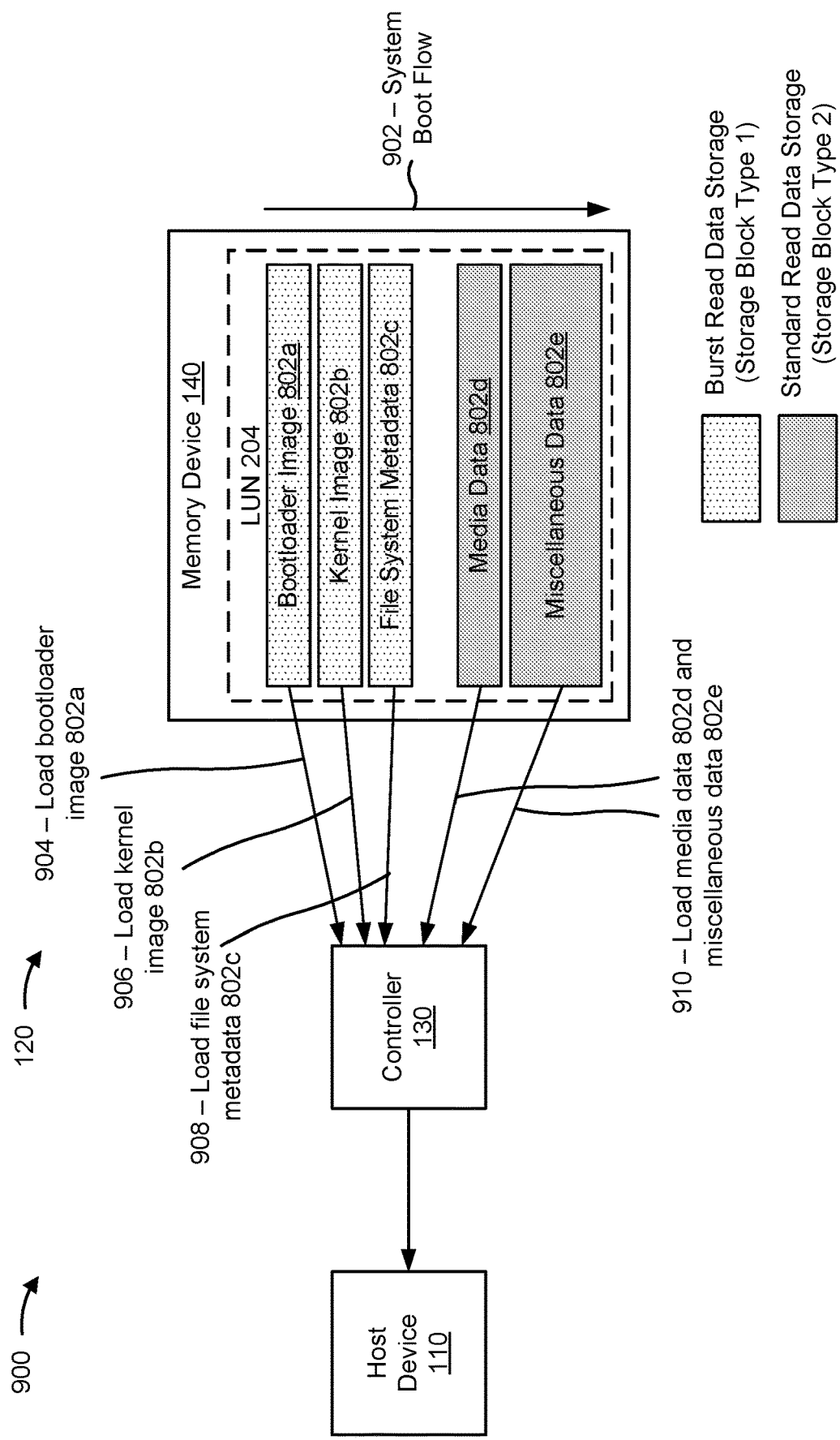

FIG. 9 is a diagram illustrating an example 900 of burst read data storage. In particular, the example 900 includes an example of reading the types of host data 802 from the memory device 140 in a system boot process. A system boot flow 902 may be performed by the host device 110 and/or the storage system 120 to load the host data 802 in the system boot process to boot the system of the host device 110.

At 904, the bootloader image 802*a* may be loaded, which may include the controller 130 reading the bootloader image 802*a* from one or more burst read data storage blocks of the memory device 140 and providing the bootloader image 802*a* to the host device 110. Prior to the controller 130 reading the bootloader image 802*a*, the host device 110 may load ROM code , which may perform a power on self test (POST) to test the hardware of the host device 110 and verify operation. If the POST is successful, the ROM code may provide a read command to the controller 130 to load the bootloader image 802*a*.

At 906, the kernel image 802*b* may be loaded, which may include the controller 130 reading the kernel image 802*b* from one or more burst read data storage blocks of the memory device 140 and providing the kernel image 802*b* to the host device 110. The host device 110 may use the bootloader image 802*a* to load the kernel image 802*b*, after which the bootloader image 802*a* hands over system control to the kernel image 802*b*. At 908, the file system metadata 802*c* may be loaded, which may include the controller 130 reading the file system metadata 802*c* from one or more burst read data storage blocks of the memory device 140 and providing the file system metadata 802*c* to the host device 110. The kernel image 802*b* may use the file system metadata 802*c* to continue to load the operating system of the host device 110. At 910, the media data 802*d* and the miscellaneous data 802e may be loaded, which may include the controller 130 reading the media data 802d and the miscellaneous data 802e from one or more standard read data storage blocks of the memory device 140 and providing the media data 802d and the miscellaneous data 802e to the host device 110.

As indicated above, FIG. 9 is provided as an example. Other examples may differ from what is described with regard to FIG. 9.

Figure 10:
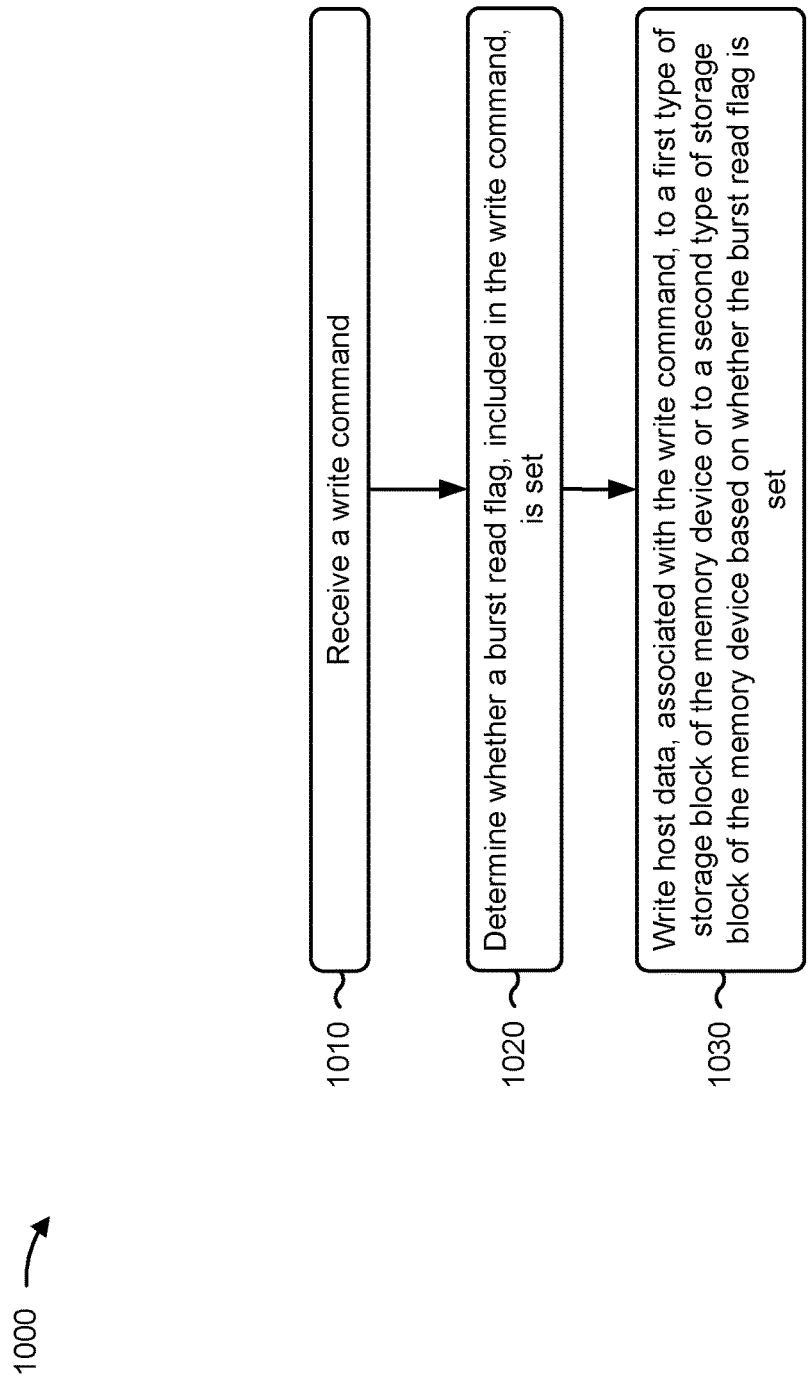
FIGS. 10-13 are flowcharts of example methods associated with burst read data storage.

FIG. 10 is a flowchart of an example method 1000 associated with burst read data storage. In some implementations, a storage system (e.g., the storage system 120, memory device 1410 of FIG. 14, memory device 1502 of FIG. 15) may perform or may be configured to perform one or more process blocks of FIG. 10. In some implementations, another device or a group of devices separate from or including the storage system (e.g., the host device 110, host device 1405 of FIG. 14) may perform or may be configured to perform one or more process blocks of FIG. 10. Additionally, or alternatively, one or more components of the storage system (e.g., the controller 130, the memory device 140, memory controller 1420 of FIG. 14, memory array 1425 of FIG. 14, memory array 1504 of FIG. 15, memory controller 1520 of FIG. 15) may perform or may be configured to perform one or more process blocks of FIG. 10.

As shown in FIG. 10, the method 1000 may include receiving a write command (block 1010). As further shown in FIG. 10, the method 1000 may include determining whether a burst read flag, included in the write command, is set (block 1020). As further shown in FIG. 10, the method 1000 may include writing host data, associated with the write command, to a first type of storage block of the memory device or to a second type of storage block of the memory device based on whether the burst read flag is set (block 1030).

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein, such as the operations described in connection with FIGS. 2-9.

Figure 11:
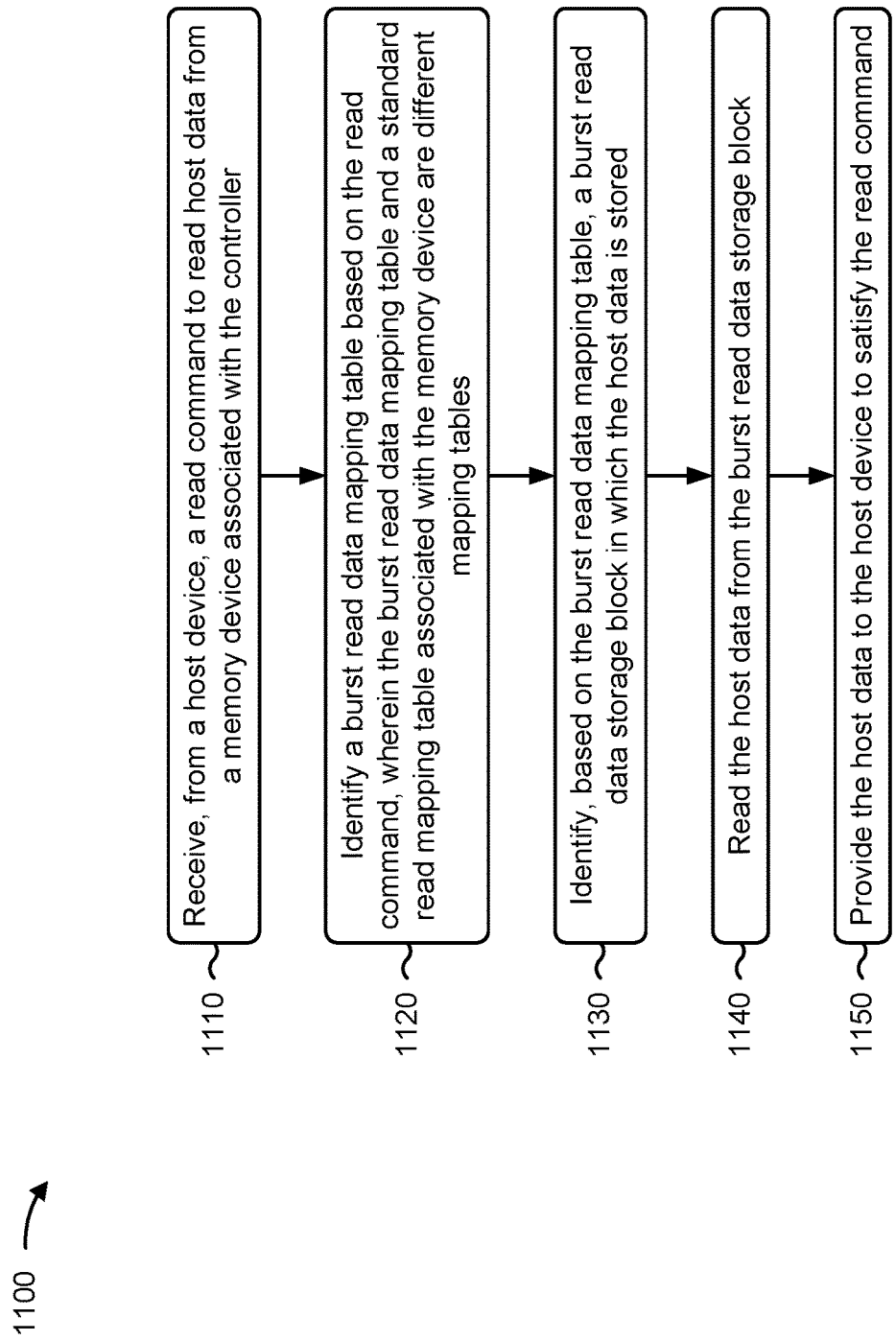

FIG. 11 is a flowchart of an example method 1100 associated with burst read data storage. In some implementations, a memory controller (e.g., the controller 130, the memory controller 1420 of FIG. 14, the memory controller 1520 of FIG. 15) may perform or may be configured to perform one or more process blocks of FIG. 11. In some implementations, another device or a group of devices separate from or including the memory controller (e.g., the host device 110, the memory device 140, the host device 1405 of FIG. 14, the memory device 1410 of FIG. 14, the memory array 1425 of FIG. 14, the memory array 1504 of FIG. 15) may perform or may be configured to perform one or more process blocks of FIG. 11. Additionally, or alternatively, one or more components of the memory controller (e.g., memory manager 1430 of FIG. 14, array controller 1435 of FIG. 14) may perform or may be configured to perform one or more process blocks of FIG. 11.

As shown in FIG. 11, the method 1100 may include receiving, from a host device, a read command to read host data from a memory device associated with the controller (block 1110). As further shown in FIG. 11, the method 1100 may include identifying a burst read data mapping table based on the read command, wherein the burst read data mapping table and a standard read mapping table associated with the memory device are different mapping tables (block 1120). As further shown in FIG. 11, the method 1100 may include identifying, based on the burst read data mapping table, a burst read data storage block in which the host data is stored (block 1130). As further shown in FIG. 11, the method 1100 may include reading the host data from the burst read data storage block (block 1140). As further shown in FIG. 11, the method 1100 may include providing the host data to the host device to satisfy the read command (block 1150).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein, such as the operations described in connection with FIGS. 2-9.

Figure 12:
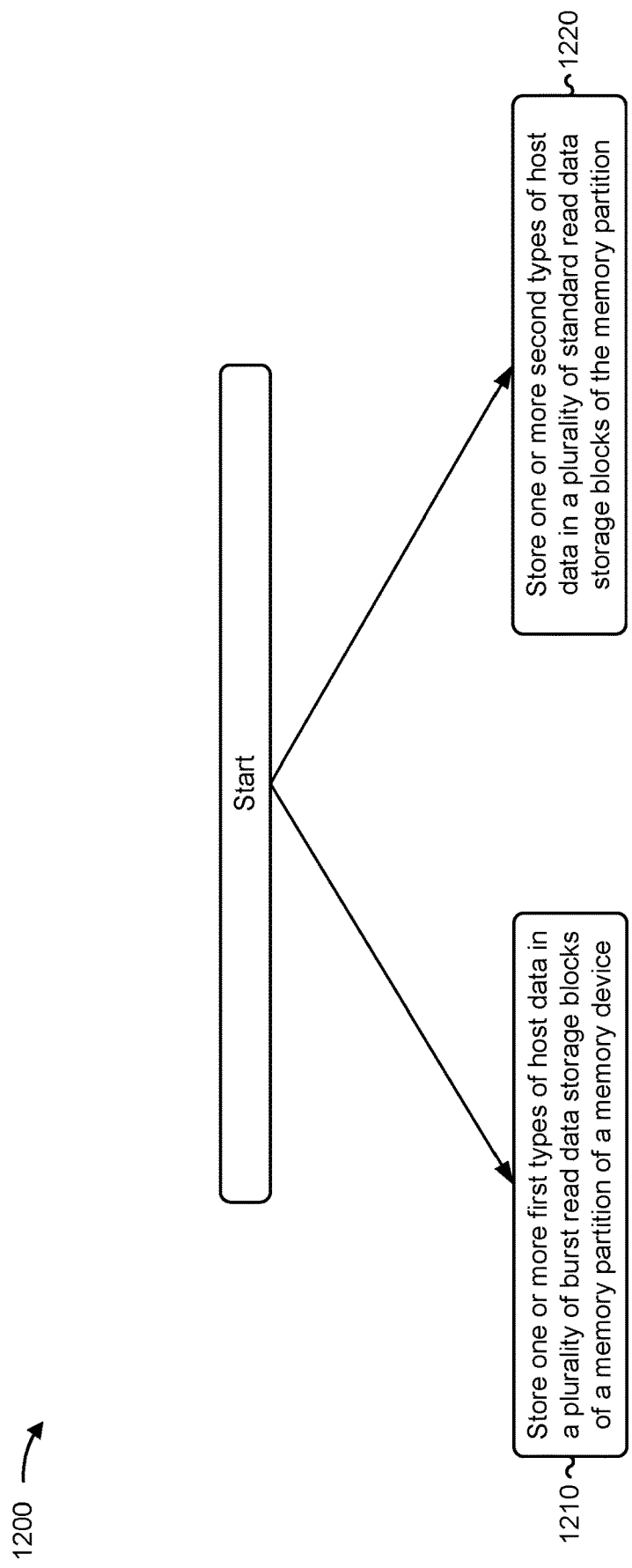

FIG. 12 is a flowchart of an example method 1200 associated with burst read data storage. In some implementations, a memory controller (e.g., the controller 130, the memory controller 1420 of FIG. 14, the memory controller 1520 of FIG. 15) may perform or may be configured to perform one or more process blocks of FIG. 12. In some implementations, another device or a group of devices separate from or including the memory controller (e.g., the host device 110, the memory device 140, the host device 1405 of FIG. 14, the memory device 1410 of FIG. 14, the memory array 1425 of FIG. 14, the memory array 1504 of FIG. 15) may perform or may be configured to perform one or more process blocks of FIG. 12. Additionally, or alternatively, one or more components of the memory controller (e.g., memory manager 1430 of FIG. 14, array controller 1435 of FIG. 14) may perform or may be configured to perform one or more process blocks of FIG. 12.

As shown in FIG. 12, the method 1200 may include storing one or more first types of host data in a plurality of burst read data storage blocks of a memory partition of a memory device (block 1210). As further shown in FIG. 12, the method 1200 may include storing one or more second types of host data in a plurality of standard read data storage blocks of the memory partition (block 1220).

Although FIG. 12 shows example blocks of a method 1200, in some implementations, the method 1200 may include additional blocks, fewer blocks, different blocks, or differently arranged blocks than those depicted in FIG. 12. Additionally, or alternatively, two or more of the blocks of the method 1200 may be performed in parallel. The method 1200 is an example of one method that may be performed by one or more devices described herein. These one or more devices may perform or may be configured to perform one or more other methods based on operations described herein, such as the operations described in connection with FIGS. 2-9.

Figure 13:
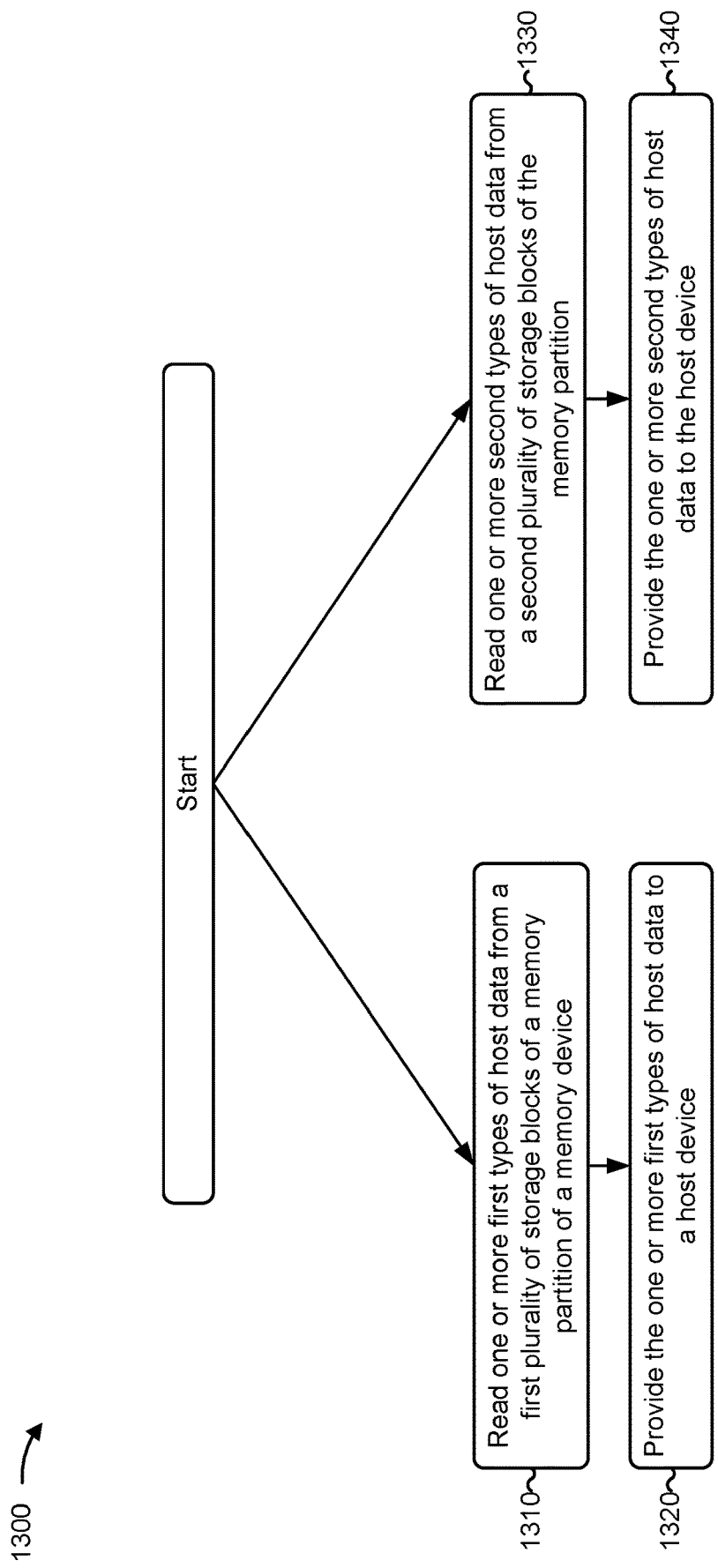

FIG. 13 is a flowchart of an example method 1300 associated with burst read data storage. In some implementations, a memory controller (e.g., the controller 130, the memory controller 1420 of FIG. 14, the memory controller 1520 of FIG. 15) may perform or may be configured to perform one or more process blocks of FIG. 13. In some implementations, another device or a group of devices separate from or including the memory controller (e.g., the host device 110, the memory device 140, the host device 1405 of FIG. 14, the memory device 1410 of FIG. 14, the memory array 1425 of FIG. 14, the memory array 1504 of FIG. 15) may perform or may be configured to perform one or more process blocks of FIG. 13. Additionally, or alternatively, one or more components of the memory controller (e.g., memory manager 1430 of FIG. 14, array controller 1435 of FIG. 14) may perform or may be configured to perform one or more process blocks of FIG. 13.

As shown in FIG. 13, the method 1300 may include reading one or more first types of host data from a first plurality of storage blocks of a memory partition of a memory device, where the first plurality of storage blocks are configured as burst read data storage blocks (block 1310). As further shown in FIG. 13, the method 1300 may include providing the one or more first types of host data to a host device (block 1320). As further shown in FIG. 13, the method 1300 may include reading one or more second types of host data from a second plurality of storage blocks of the memory partition, wherein the second plurality of storage blocks are configured as standard read data storage blocks (block 1330). As further shown in FIG. 13, the method 1300 may include providing the one or more second types of host data to the host device (block 1340).

Although FIG. 13 shows example blocks of a method 1300, in some implementations, the method 1300 may include additional blocks, fewer blocks, different blocks, or differently arranged blocks than those depicted in FIG. 13. Additionally, or alternatively, two or more of the blocks of the method 1300 may be performed in parallel. The method 1300 is an example of one method that may be performed by one or more devices described herein. These one or more devices may perform or may be configured to perform one or more other methods based on operations described herein, such as the operations described in connection with FIGS. 2-9.

Figure 14:
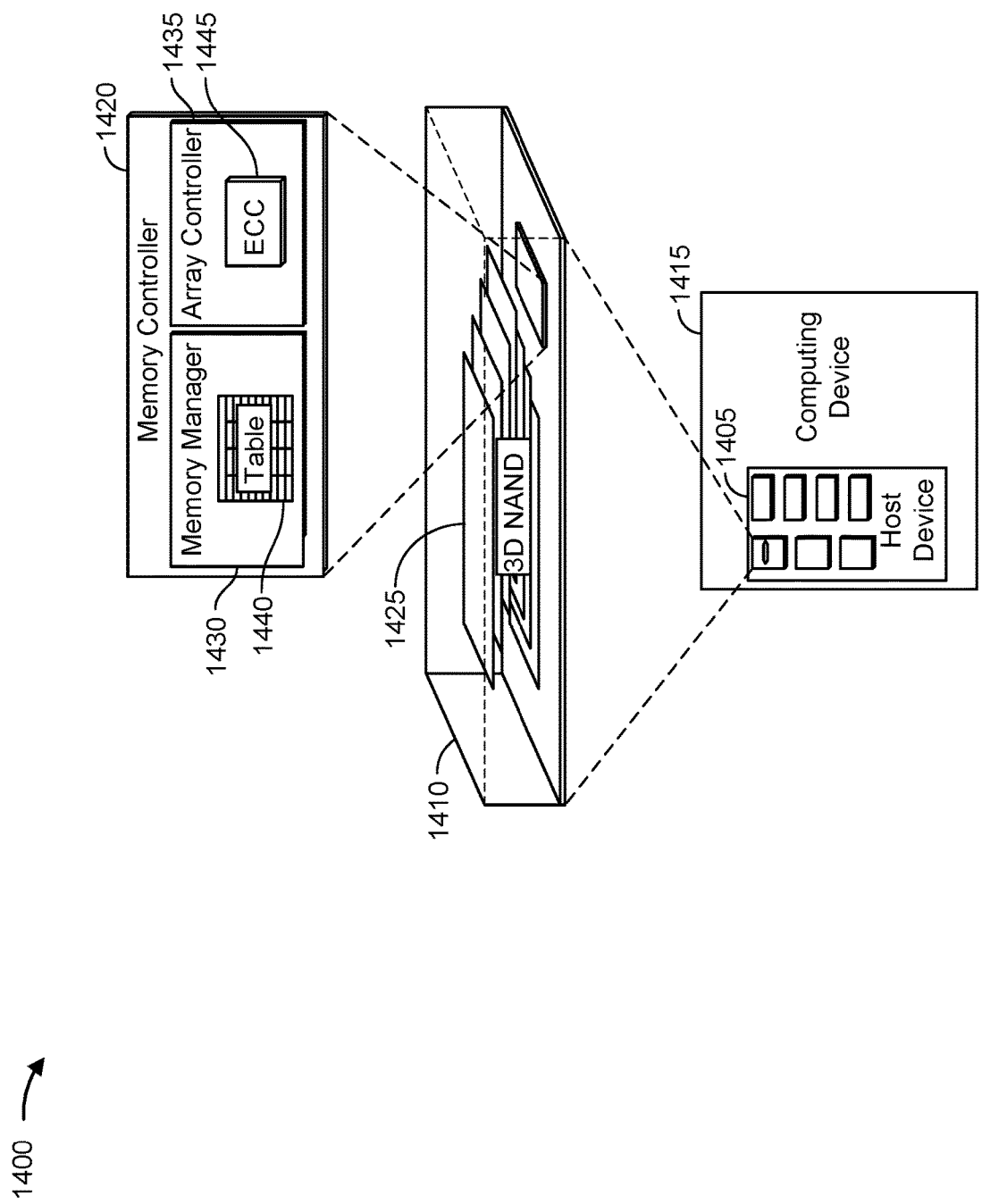
FIG. 14 is a diagram illustrating an example environment that includes a memory device.

FIG. 14 is a diagram illustrating an example environment 1400 that includes a memory device. As shown in FIG. 14, the environment 1400 includes a host device 1405 and a memory device 1410 configured to communicate via a communication interface. The host device 1405 and/or the memory device 1410 may be included in a computing device 1415. The computing device 1415 may include a computer, a server, a sensor, a vehicle device, and/or an IoT device, among other examples. The memory device 1410 may be a discrete memory component of the host device 1405. Alternatively, the memory device 1410 may be a portion of an integrated circuit that is included with one or more other components of the host device 1405. In some implementations, the host device 1405 may include or may be included in the host device 110. The memory device 1410 may include or may be included in the storage system 120.

The memory device 1410 may include a memory controller 1420. The memory controller 1420 may include or may be included in the controller 130. Additionally, or alternatively, the memory device 1410 may include a memory array 1425. The memory array 1425 may include or may be included in the memory device 140. The memory array 1425 may include one or more memory dies. The memory array 1425 is shown as a three-dimensional (3D) NAND array. In 3D array semiconductor memory technology, memory structures are stacked vertically, which increases the quantity of memory cells that can fit in a given die size. Although the memory array 1425 is shown as a 3D array, in some implementations, the memory array 1425 is a two-dimensional (2D) array.

The host device 1405 and/or the memory device 1410 may include one or more communication interfaces configured to transfer data between the memory device 1410 and one or more components of the host device 1405. For example, the host device 1405 and/or the memory device 1410 may include a Serial Advanced Technology Attachment (SATA) interface, a Peripheral Component Interconnect Express (PCIe) interface, a USB interface, a Universal Flash Storage (UFS) interface, and/or an embedded multimedia card (eMMC) interface.

The memory controller 1420 may include, for example, one or more processors, a microcontroller, an ASIC, and/or an FPGA. In some implementations, a non-transitory computer-readable medium (e.g., volatile memory and/or non-volatile memory) may store a set of instructions (e.g., one or more instructions or code) for execution by the memory controller 1420. The memory controller 1420 may execute the set of instructions to perform one or more operations or methods described herein. In some implementations, execution of the set of instructions, by the memory controller 1420, causes the memory controller 1420 and/or the memory device 1410 to perform one or more operations or methods described herein. In some implementations, hard-wired circuitry is used instead of or in combination with the instructions to perform one or more operations or methods described herein. Additionally, or alternatively, the memory controller 1420 and/or one or more components of the memory device 1410 may be configured to perform one or more operations or methods described herein.

The memory controller 1420 may receive one or more instructions from the host device 1405 and may communicate with the memory array based on the one or more instructions, such as to transfer data to (e.g., write or program), to transfer data from (e.g., read), and/or to erase a portion of the memory array 1425 (e.g., one or more memory cells, pages, sub-blocks, blocks, or planes of the memory array 1425). Additionally, or alternatively, the memory controller 1420 may include one or more components configured to control access to the memory array 1425 and/or to provide a translation layer between the host device 1405 and the memory device 1410 for access to the memory array 1425. The memory controller 1420 may include one or more input/output (I/O) circuits, lines, or interfaces to transfer data to or from the memory array 1425. In some implementations, the memory controller 1420 may include a memory manager 1430 and/or an array controller 1435.

The memory manager 1430 may include one or more components (e.g., circuitry) configured to perform one or more memory management functions, such as wear leveling, error detection, error correction, block retirement, or one or more other memory management functions. The memory manager 1430 may parse or format a host command (e.g., a command received from the host device 1405) into a memory command (e.g., a command for performing an operation on the memory array 1425). Additionally, or alternatively, the memory manager 1430 may generate one or more memory commands based on one or more instructions received from the array controller 1435 and/or one or more other components of the memory device 1410.

The memory manager 1430 may include or may operate using one or more memory management tables 1440 configured to store information associated with the memory array 1425. For example, a memory management table 1440 may include information regarding block age, block erase count, error history, or one or more error counts associated with one or more blocks of memory cells included in the memory array 1425.

The array controller 1435 may include one or more components (e.g., circuitry) configured to control one or more memory operations associated with writing data to, reading data from, or erasing one or more memory cells of the memory array 1425. The one or more memory operations may be based on, for example, a host command received from the host device 1405 or a command generated internally by the memory device 1410 (e.g., in association with wear leveling, error detection, and/or error correction). In some implementations, the array controller 1435 may include an error correction code (ECC) component 1445. The ECC component 1445 may include one or more components configured to detect or correct errors associated with writing data to or reading data from one or more memory cells of the memory array 1425.

One or more devices or components shown in FIG. 14 may be used to carry out operations described elsewhere herein, such as one or more operations of FIGS. 2-9 and/or one or more process blocks of the methods of FIGS. 10-13.

As indicated above, FIG. 14 is provided as an example. Other examples may differ from what is described with regard to FIG. 14.

Figure 15:
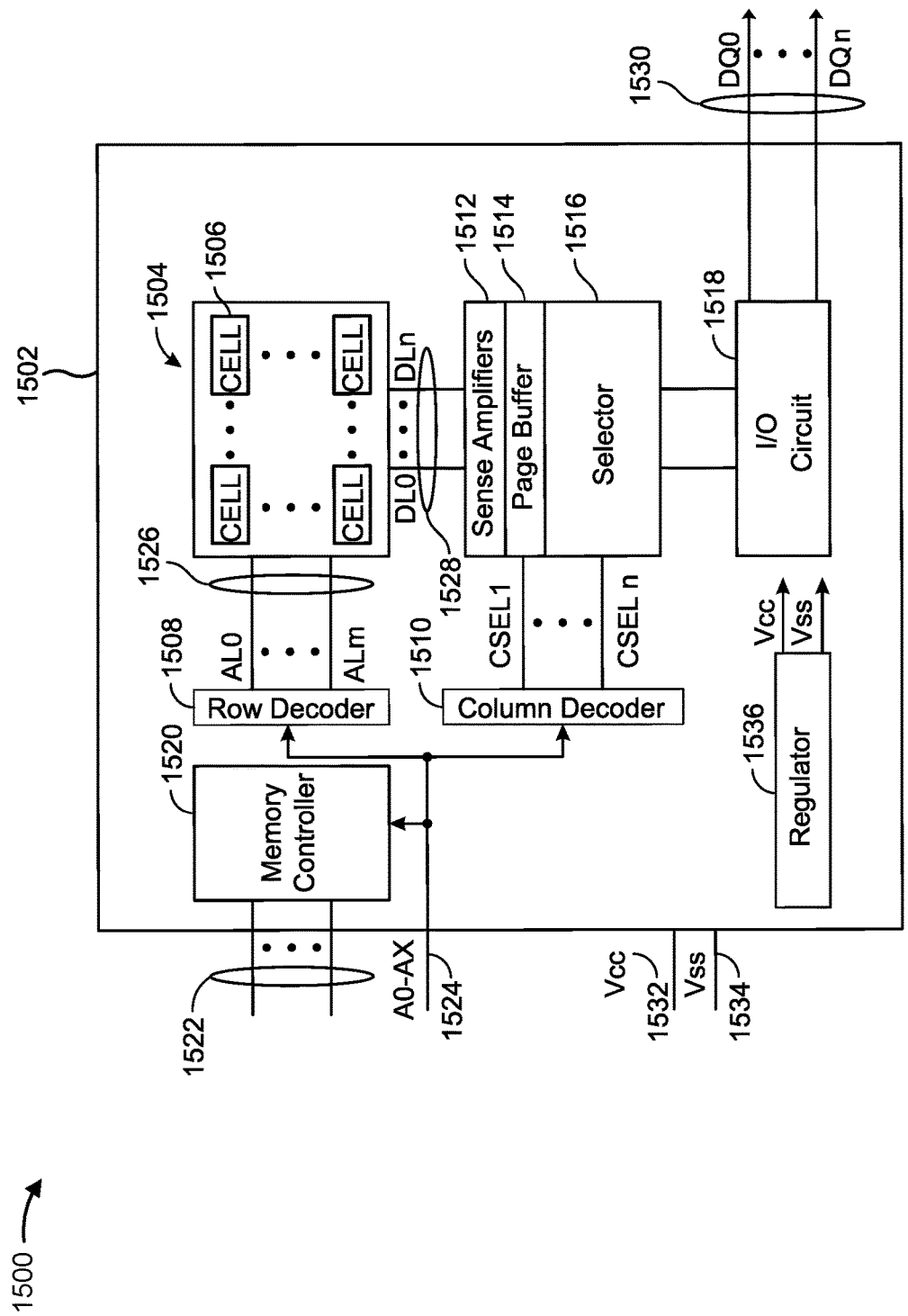
FIG. 15 is a diagram illustrating an example of components included in a memory device.

FIG. 15 is a diagram illustrating an example 1500 of components included in a memory device 1502. The memory device 1502 may include or may be included in the memory device 1410 and/or the storage system 120. The memory device 1502 may include a memory array 1504 having multiple memory cells 1506. The memory array 1504 may include or may be included in the memory device 140 and/or the memory array 1425. The memory device 1502 may include one or more components (e.g., circuits) to transmit signals to or perform memory operations on the memory array 1504. For example, the memory device 1502 may include a row decoder 1508, a column decoder 1510, one or more sense amplifiers 1512, a page buffer 1514, a selector 1516, an input/output (I/O) circuit 1518, and a memory controller 1520. The memory controller 1520 may include or may be included in the controller 130 and/or the memory controller 1420.

The memory controller 1520 may control memory operations of the memory device 1502 according to one or more signals received via one or more control lines 1522, such as one or more clock signals or control signals that indicate an operation (e.g., write, read, or erase) to be performed. Additionally, or alternatively, the memory controller 1520 may determine one or memory cells 1506 upon which the operation is to be performed based on one or more signals received via one or more address lines 1524, such as one or more address signals (shown as A0-AX). A host device external from the memory device 1502 may control the values of the control signals on the control lines 1522 and/or the address signals on the address line 1524.

The memory device 1502 may use access lines 1526 (sometimes called word lines or row lines, and shown as AL0-ALm) and data lines 1528 (sometimes called digit lines, bit lines, or column lines, and shown as DL0-DLn) to transfer data to or from one or more of the memory cells 1506. For example, the row decoder 1508 and the column decoder 1510 may receive and decode the address signals (AO-AX) from the address line 1524 and may determine which of the memory cells 1506 are to be accessed based on the address signals. The row decoder 1508 and the column decoder 1510 may provide signals to those memory cells 1506 via one or more access lines 1526 and one or more data lines 1528, respectively.

For example, the column decoder 1510 may receive and decode address signals into one or more column select signals (shown as CSEL1-CSELn). The selector 1516 may receive the column select signals and may select data in the page buffer 1514 that represents values of data to be read from or to be programmed into memory cells 1506. The page buffer 1514 may be configured to store data received from a host device before the data is programmed into relevant portions of the memory array 1504, or the page buffer 1514 may store data read from the memory array 1504 before the data is transmitted to the host device. The sense amplifiers 1512 may be configured to determine the values to be read from or written to the memory cells 1506 using the data lines 1528. For example, in a selected string of memory cells 1506, a sense amplifier 1512 may read a logic level in a memory cell 1506 in response to a read current flowing through the selected string to a data line 1528. The I/O circuit 1518 may transfer values of data into or out of the memory device 1502 (e.g., to or from a host device), such as into or out of the page buffer 1514 or the memory array 1504, using I/O lines 1530 (shown as (DQ0-DQn)).

The memory controller 1520 may receive positive and negative supply signals, such as a supply voltage (Vcc) 1532 and a negative supply (Vss) 1534 (e.g., a ground potential), from an external source or power supply (e.g., an internal battery, an external battery, and/or an AC-to-DC converter). In some implementations, the memory controller 1520 may include a regulator 1536 to internally provide positive or negative supply signals.

One or more devices or components shown in FIG. 15 may be used to carry out operations described elsewhere herein, such as one or more operations of FIGS. 2-9 and/or one or more process blocks of the methods of FIGS. 10-13.

As indicated above, FIG. 15 is provided as an example. Other examples may differ from what is described with regard to FIG. 15.

Figure 16:
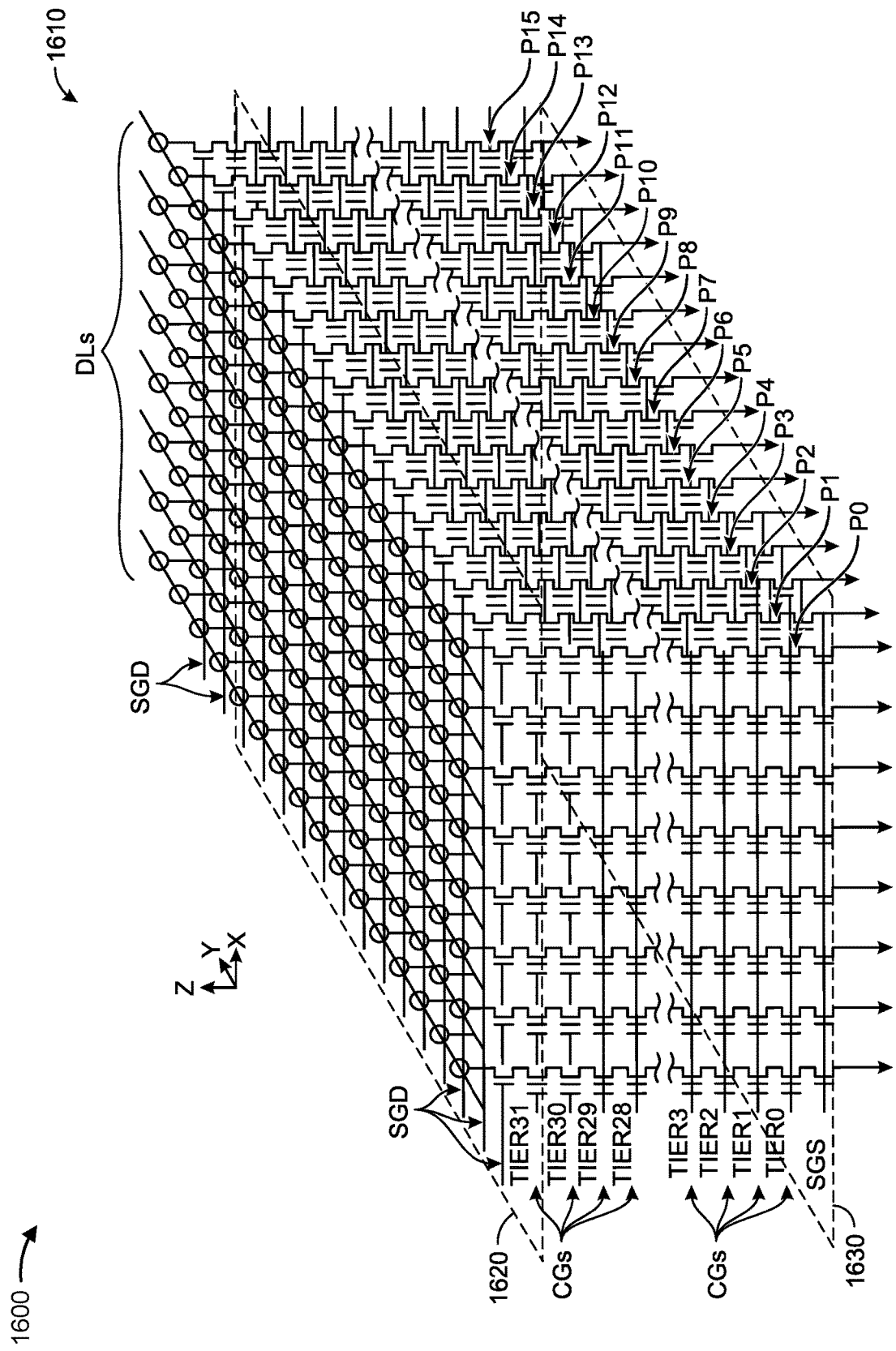
FIG. 16 is a diagram illustrating an example of a memory array.

FIG. 16 is a diagram illustrating an example 1600 of a memory array 1610. Although FIG. 16 shows a 3D NAND memory array, some implementations described herein may be performed in connection with another type of memory array, such as a 2D memory array.

The memory array 1610 includes multiple strings of memory cells, and each string including 32 tiers (shown as TIER0-TIER31) of charge storage transistors stacked in the Z direction, source to drain, from a source-side select gate (SGS) to a drain-side select gate (SGD). Each string of memory cells in the memory array 1610 may be arranged along the Y direction as data lines (shown as DLs), and along the X direction as pages (shown as P0-P15). Within a page, each tier represents a row of memory cells, and each string of memory cells represents a column. A block of memory cells may include a number of pages (e.g., 128 or 384). In other examples, each string of memory cells may include a different number of tiers (e.g., 8, 16, 64, or 128), and/or one or more additional tiers of semiconductor material above or below the charge storage transistors (e.g., to form select gates or data lines).

Each memory cell in the memory array 1610 includes a control gate coupled to (e.g., electrically or otherwise operatively connected to) an access line, which collectively couples the control gates across a specific tier or a portion of a tier. Specific tiers in the 3D memory array, and accordingly, specific memory cells in a string, may be accessed or controlled using respective access lines. For example, the memory array 1610 includes a first level of semiconductor material 1620 (e.g., silicon material, such as polysilicon) that couples the control gates of each memory cell in TIER31, and a second level of semiconductor material 1630 that couples the SGS of the array. Similar levels of metal or semiconductor material may couple the control gates for each tier. Specific strings of memory cells in the array may be accessed, selected, or controlled using a combination of data lines (DLs) and select gates, and specific memory cells at one or more tiers in the specific strings may be accessed, selected, or controlled using one or more access lines. In some implementations, the memory device 1410, the memory device 1502, and/or the memory device 140 may include the memory array 1610 of FIG. 16. For example, the memory array 1425, the memory device 140, and/or the memory array 1504 may be the memory array 1610.

As indicated above, FIG. 16 is provided as an example. Other examples may differ from what is described with regard to FIG. 16.

Figure 17:
FIGS. 17 and 18 are flowcharts of example methods associated with burst data management.

FIG. 17 is a flowchart of an example method 1700 associated with burst read data management. In some implementations, a memory controller (e.g., the controller 130, the memory controller 1420 of FIG. 14, the memory controller 1520 of FIG. 15) may perform or may be configured to perform one or more process blocks of FIG. 17. In some implementations, another device or a group of devices separate from or including the memory controller (e.g., the host device 170, the memory device 140, the host device 1405 of FIG. 14, the memory device 1410 of FIG. 14, the memory array 1425 of FIG. 14, the memory array 1504 of FIG. 15) may perform or may be configured to perform one or more process blocks of FIG. 17. Additionally, or alternatively, one or more components of the memory controller (e.g., memory manager 1430 of FIG. 14, array controller 1435 of FIG. 14) may perform or may be configured to perform one or more process blocks of FIG. 17.

As shown in FIG. 17, the method 1700 may include receiving a query-get command from a host device (block 1710). As further shown in FIG. 17, the method 1700 may include storing burst read data information in a burst read data table (block 1720). The burst read data information may be collected and stored in the burst read data table based on the query-get command. Each entry in the burst read data table may describe one area for burst data, including a LUN, a starting LBA, and/or a size, among other examples. As further shown in FIG. 17, the method 1700 may include providing the burst read data table to the host device (block 1730). The burst read data table may be provided to the host device to satisfy the query-get command.

Although FIG. 17 shows example blocks of a method 1700, in some implementations, the method 1700 may include additional blocks, fewer blocks, different blocks, or differently arranged blocks than those depicted in FIG. 17. Additionally, or alternatively, two or more of the blocks of the method 1700 may be performed in parallel. The method 1700 is an example of one method that may be performed by one or more devices described herein. These one or more devices may perform or may be configured to perform one or more other methods based on operations described herein, such as the operations described in connection with FIGS. 2-9.

Figure 18:
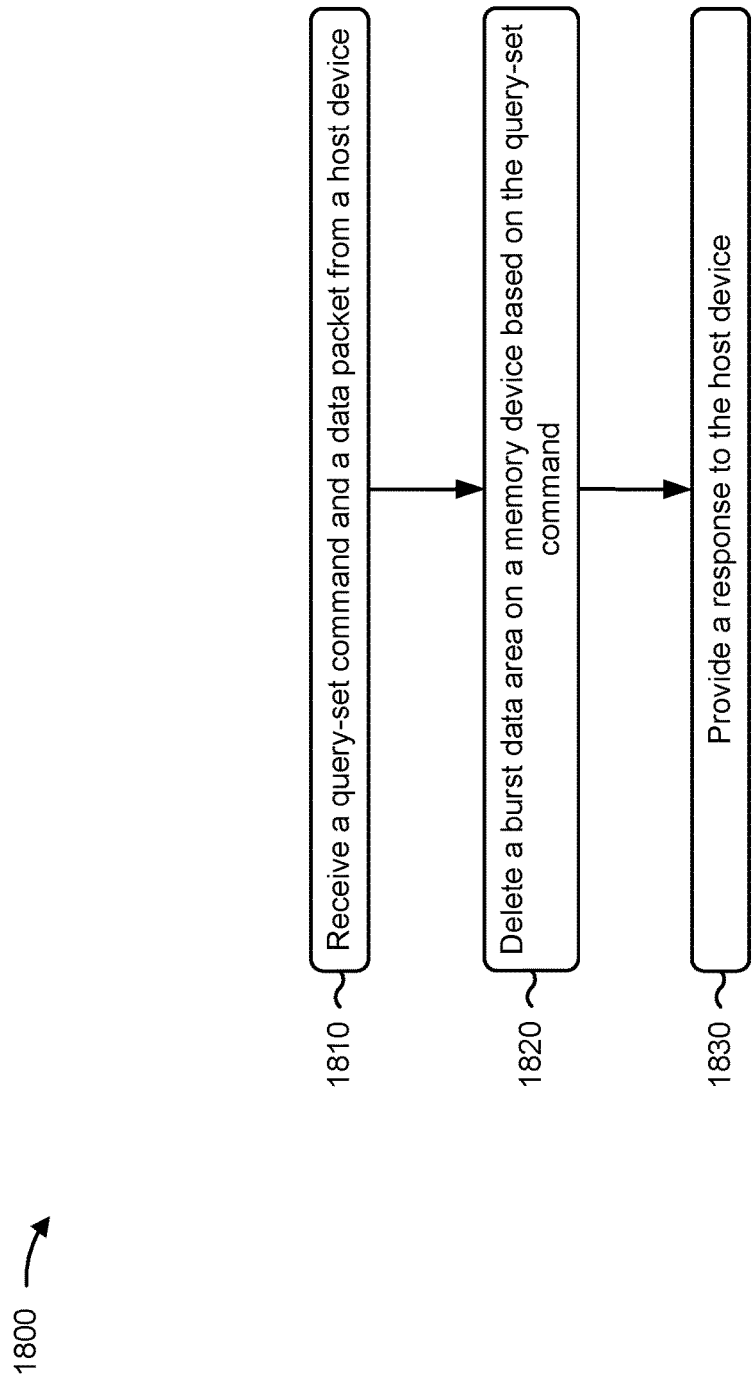

FIG. 18 is a flowchart of an example method 1800 associated with burst read data management. In some implementations, a memory controller (e.g., the controller 130, the memory controller 1420 of FIG. 14, the memory controller 1520 of FIG. 15) may perform or may be configured to perform one or more process blocks of FIG. 18. In some implementations, another device or a group of devices separate from or including the memory controller (e.g., the host device 180, the memory device 140, the host device 1405 of FIG. 14, the memory device 1410 of FIG. 14, the memory array 1425 of FIG. 14, the memory array 1504 of FIG. 15) may perform or may be configured to perform one or more process blocks of FIG. 18. Additionally, or alternatively, one or more components of the memory controller (e.g., memory manager 1430 of FIG. 14, array controller 1435 of FIG. 14) may perform or may be configured to perform one or more process blocks of FIG. 18.

As shown in FIG. 18, the method 1800 may include receiving a query-set command and a data packet from a host device (block 1810). The data packet may include a table. Each entry in the table may be used to delete one burst data area, including a LUN, an LBA, and/or a size, among other examples. These parameters may be obtained through the query-set command. As further shown in FIG. 18, the method 1800 may include deleting a burst data area on a memory device based on the query-set command (block 1820). As further shown in FIG. 18, the method 1800 may include providing a response to the host device (block 1830). The response may include an indication that the burst data area has been deleted. The response may be provided to satisfy the query-set command.

Although FIG. 18 shows example blocks of a method 1800, in some implementations, the method 1800 may include additional blocks, fewer blocks, different blocks, or differently arranged blocks than those depicted in FIG. 18. Additionally, or alternatively, two or more of the blocks of the method 1800 may be performed in parallel. The method 1800 is an example of one method that may be performed by one or more devices described herein. These one or more devices may perform or may be configured to perform one or more other methods based on operations described herein, such as the operations described in connection with FIGS. 2-9.

In some implementations, a storage system includes a memory device and a controller. The controller is configured to receive a write command. The controller s configured to determine whether a burst read flag, included in the write command, is set. The controller is configured to write host data, associated with the write command, to a first type of storage block of the memory device or to a second type of storage block of the memory device based on whether the burst read flag is set.

In some implementations, a method includes receiving, by a controller and from a host device, a read command to read host data from a memory device associated with the controller. The method includes identifying by the controller, a burst read data mapping table based on the read command, where the burst read data mapping table and a standard read mapping table associated with the memory device are different mapping tables. The method includes identifying, by the controller and based on the burst read data mapping table, a burst read data storage block in which the host data is stored. The method includes reading, by the controller, the host data from the burst read data storage block. The method includes providing, by the controller, the host data to the host device to satisfy the read command.

In some implementations, a memory controller includes one or more components. The one or more components are configured to store one or more first types of host data in a plurality of burst read data storage blocks of a memory partition of a memory device. The one or more components are configured to store one or more second types of host data in a plurality of standard read data storage blocks of the memory partition.

In some implementations, an apparatus includes means for reading one or more first types of host data from a first plurality of storage blocks of a memory partition of a memory device, where the first plurality of storage blocks are configured as burst read data storage blocks. The apparatus includes means for providing the one or more first types of host data to a host device. The apparatus includes means for reading one or more second types of host data from a second plurality of storage blocks of the memory partition, where the second plurality of storage blocks are configured as standard read data storage blocks. The apparatus includes means for providing the one or more second types of host data to the host device.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A storage system, comprising:
   a memory device; and
   a controller configured to:
   receive a write command;
   determine whether a burst read flag, included in the write command, is set;
   write host data, associated with the write command, to a first type of storage block of the memory device or to a second type of storage block of the memory device based on whether the burst read flag is set;
   maintain a first mapping table, associated with the first type of storage block, that identifies an association between logical addresses and physical addresses for burst data storage of the host data; and
   maintain a second mapping table, associated with the second type of storage block, that identifies an association between logical addresses and physical addresses for other data storage of the host data.

2. The storage system of claim 1, wherein the first type of storage block and the second type of storage block are included in a same logical unit of the memory device,
   wherein the logical unit is identified by a single logical unit number (LUN).

3. The storage system of claim 1, wherein the first type of storage block is a single level cell (SLC) storage block; and
   wherein the second type of storage block is a multiple level cell (MLC) storage block.

4. The storage system of claim 1, further comprising a random access memory (RAM) device,
   wherein the controller is configured to:
   store the first mapping table
      in the RAM device during operation of the storage system; and
   store the second mapping table in a non-volatile memory device.

5. The storage system of claim 1, wherein the controller is configured to:
   determine that the burst read flag is set; and
   write the host data to the first type of storage block based on determining that the burst read flag is set.

6. The storage system of claim 5, wherein the controller is configured to:
   receive the write command from a host device; and
   provide a write success response to the host device,
      wherein the write success response indicates that the host data was successfully written to the first type of storage block.

7. The storage system of claim 1, wherein the controller is configured to:
   determine that the burst read flag is not set; and
   write the host data to the second type of storage block based on determining that the burst read flag is not set.

8. The storage system of claim 1, wherein the controller is configured to:
   receive a read command; and
   read the host data from the first type of storage block of the memory device based on the read command.

9. A method, comprising:
   receiving, by a controller and from a host device, a read command to read host data from a memory device associated with the controller;
   identifying, based on the read command, a burst read data mapping table that identifies an association between logical addresses and physical addresses for burst data storage,
      wherein the burst read data mapping table is different from a standard read mapping table that is associated with the memory device and identifies an association between logical addresses and physical addresses for other data storage;
   identifying, based on the burst read data mapping table, a burst read data storage block in which the host data is stored;

reading the host data from the burst read data storage block; and providing the host data to the host device to satisfy the read command.

10. The method of claim 9, wherein identifying the burst read data mapping table comprises:
identifying the burst read data mapping table in a random access memory (RAM) device associated with the controller.

11. The method of claim 9, wherein reading the host data from the burst read data storage block comprises:
reading the host data from the burst read data storage block,
wherein the host data is written to the burst read data storage block using one or more first trim parameters,
wherein the one or more first trim parameters that are configured for the burst read data storage block are different from one or more second trim parameters that are configured for a standard read data storage block of the memory device.

12. The method of claim 11, wherein the one or more first trim parameters are configured to provide increased read speeds for the burst read data storage block relative to read speeds for the standard read data storage block.

13. The method of claim 11, wherein the one or more first trim parameters comprise one or more read-enhanced trim parameters.

14. A memory controller, comprising:
one or more components configured to:
store one or more first types of host data in a plurality of burst read data storage blocks of a memory partition of a memory device;
store one or more second types of host data in a plurality of standard read data storage blocks of the memory partition;
maintain a first mapping table, associated with the plurality of burst read data storage blocks, that identifies an association between logical addresses and physical addresses for burst data storage; and
maintain a second mapping table, associated with the plurality of standard read data storage blocks, that identifies an association between logical addresses and physical addresses for other data storage.

15. The memory controller of claim 14, wherein the one or more first types of host data comprise at least one of:
a bootloader image associated with a host device,
a kernel image associated with the host device, or
file system metadata associated with the host device.

16. The memory controller of claim 15, wherein the one or more second types of host data comprise at least one of:
media data associated with the host device, or
miscellaneous data associated with the host device.

17. The memory controller of claim 14, wherein the memory controller is configured to:
store the one or more first types of host data as page aligned in the plurality of burst read data storage blocks.

18. The memory controller of claim 14, wherein the memory controller is configured to:
store the one or more first types of host data as block aligned in the plurality of burst read data storage blocks.

19. The memory controller of claim 14, wherein the memory controller is configured to:

convert a subset of the plurality of standard read data storage blocks to additional burst read data storage blocks; and
store the one or more first types of host data in the additional burst read data storage blocks.

20. The memory controller of claim 14, wherein the one or more components are configured to:
store the one or more first types of host data in the plurality of burst read data storage blocks in a single level cell (SLC) mode; and
store one or more second types of host data in a plurality of standard read data storage blocks in a multiple level cell (MLC) mode.

21. An apparatus, comprising:
means for reading one or more first types of host data from a first plurality of storage blocks of a memory partition of a memory device based on a burst read mapping table that identifies an association between logical addresses and physical addresses for burst data storage,
wherein the first plurality of storage blocks are configured as burst read data storage blocks;
means for providing the one or more first types of host data to a host device;
means for reading one or more second types of host data from a second plurality of storage blocks of the memory partition based on a standard read mapping table that is associated with the memory device and identifies an association between logical addresses and physical addresses for other data storage,
wherein the second plurality of storage blocks are configured as standard read data storage blocks, and
wherein the burst read mapping table and the standard read mapping table are different mapping tables; and
means for providing the one or more second types of host data to the host device.

22. The apparatus of claim 21, wherein the first plurality of storage blocks being configured as burst read data storage blocks results in reduced read times for the one or more first types of host data relative to read times for the one or more second types of host data.

23. The apparatus of claim 21, wherein the means for reading the one or more first types of host data comprises at least one of:
means for reading a bootloader image from one or more of the first plurality of storage blocks as part of a system boot process associated with the host device,
means for reading a kernel image from one or more of the first plurality of storage blocks as part of a system boot process associated with the host device, or
means for reading file system metadata from one or more of the first plurality of storage blocks as part of a system boot process associated with the host device.

24. The apparatus of claim 23, wherein the means for reading the one or more second types of host data comprises at least one of:
means for reading media data from one or more of the second plurality of storage blocks, or
means for reading miscellaneous data from one or more of the second plurality of storage blocks as part of a system boot process associated with the host device.

25. The apparatus of claim 21, wherein the means for reading the one or more second types of host data comprises:
means for reading the one or more second types of host data from the second plurality of storage blocks after reading the one or more first types of host data from the first plurality of storage blocks.

* * * * *